Figure 1:
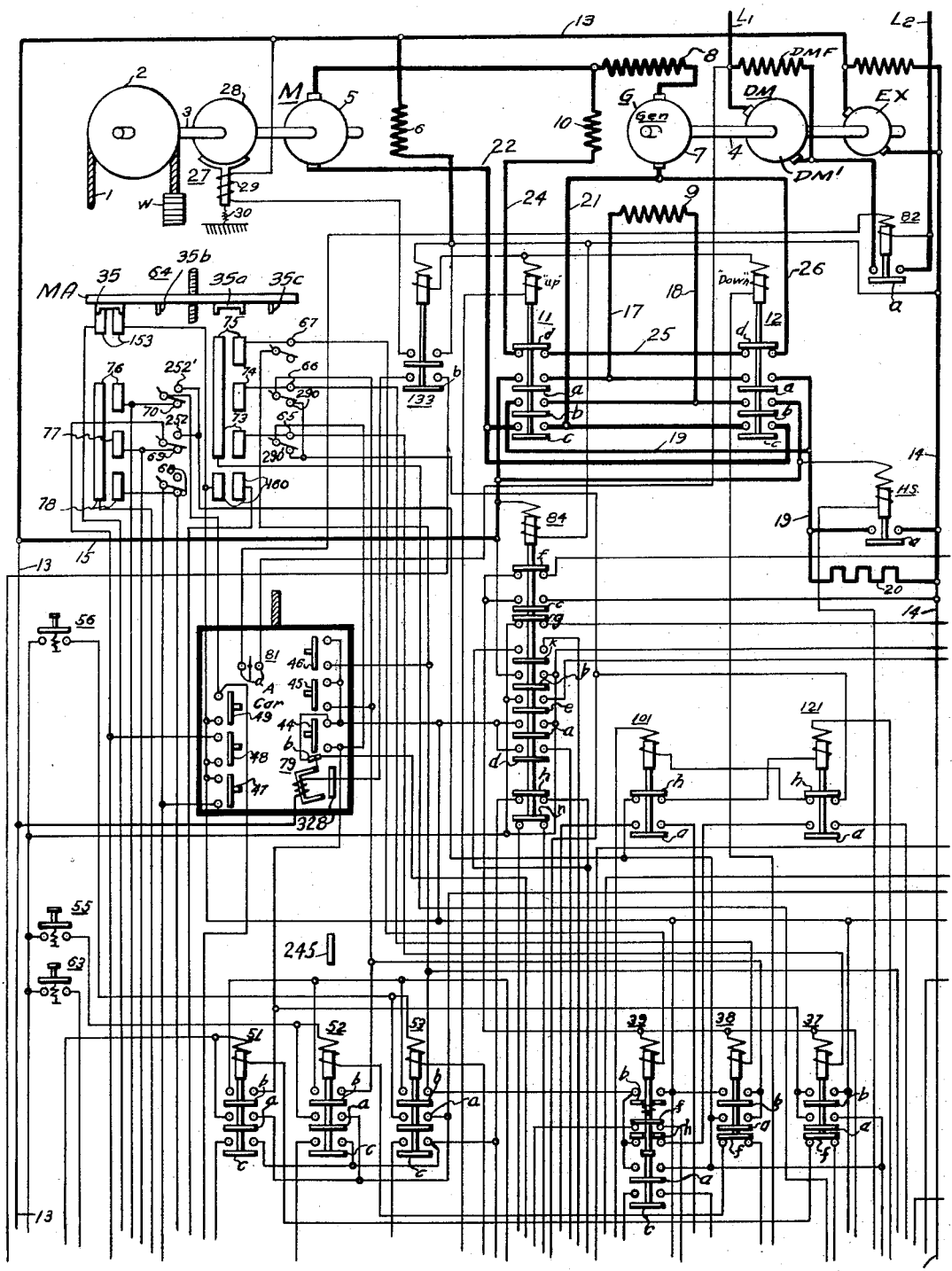
Figure 2:
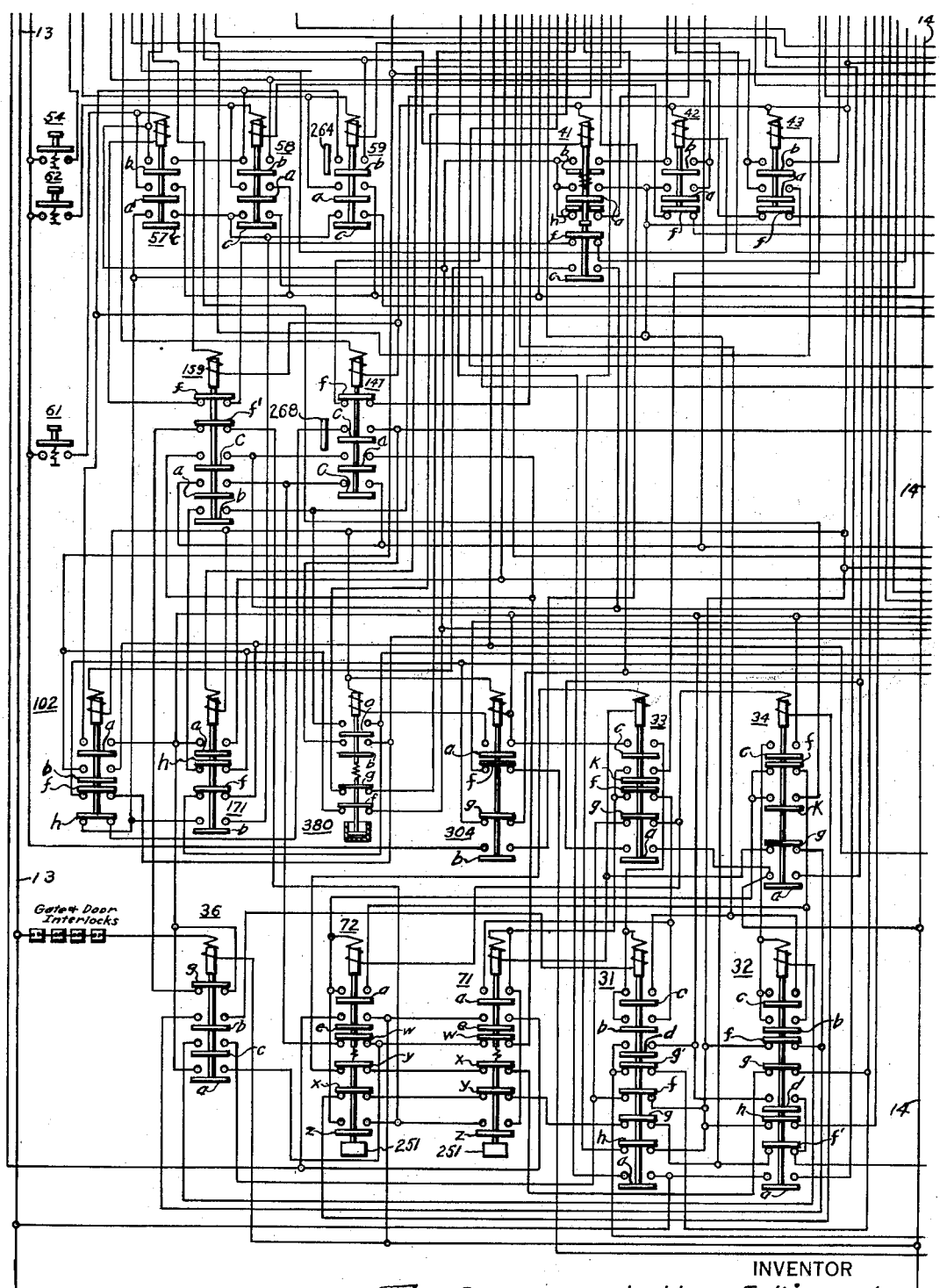
Figure 3:
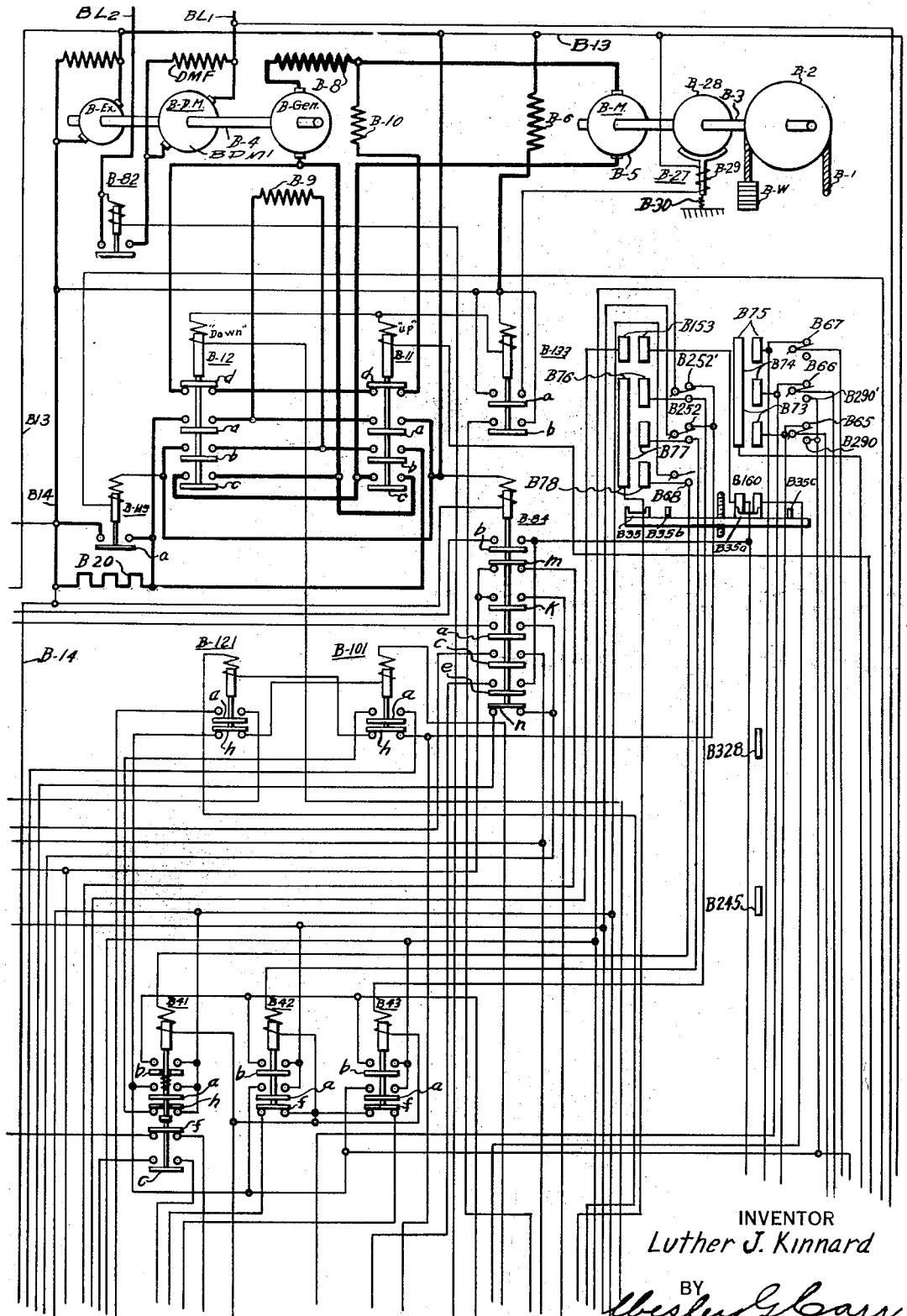
Figure 4:
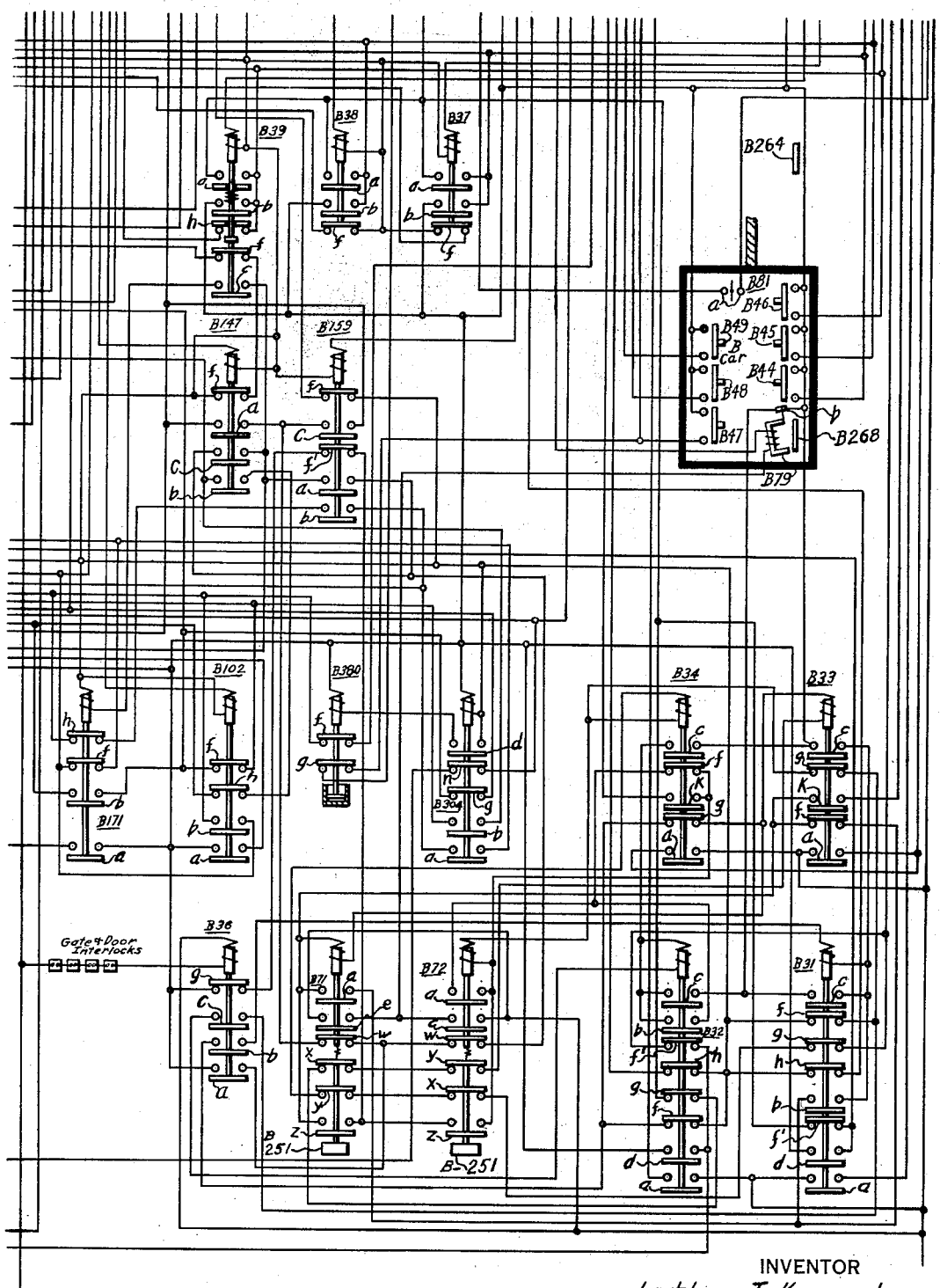
Figure 5:
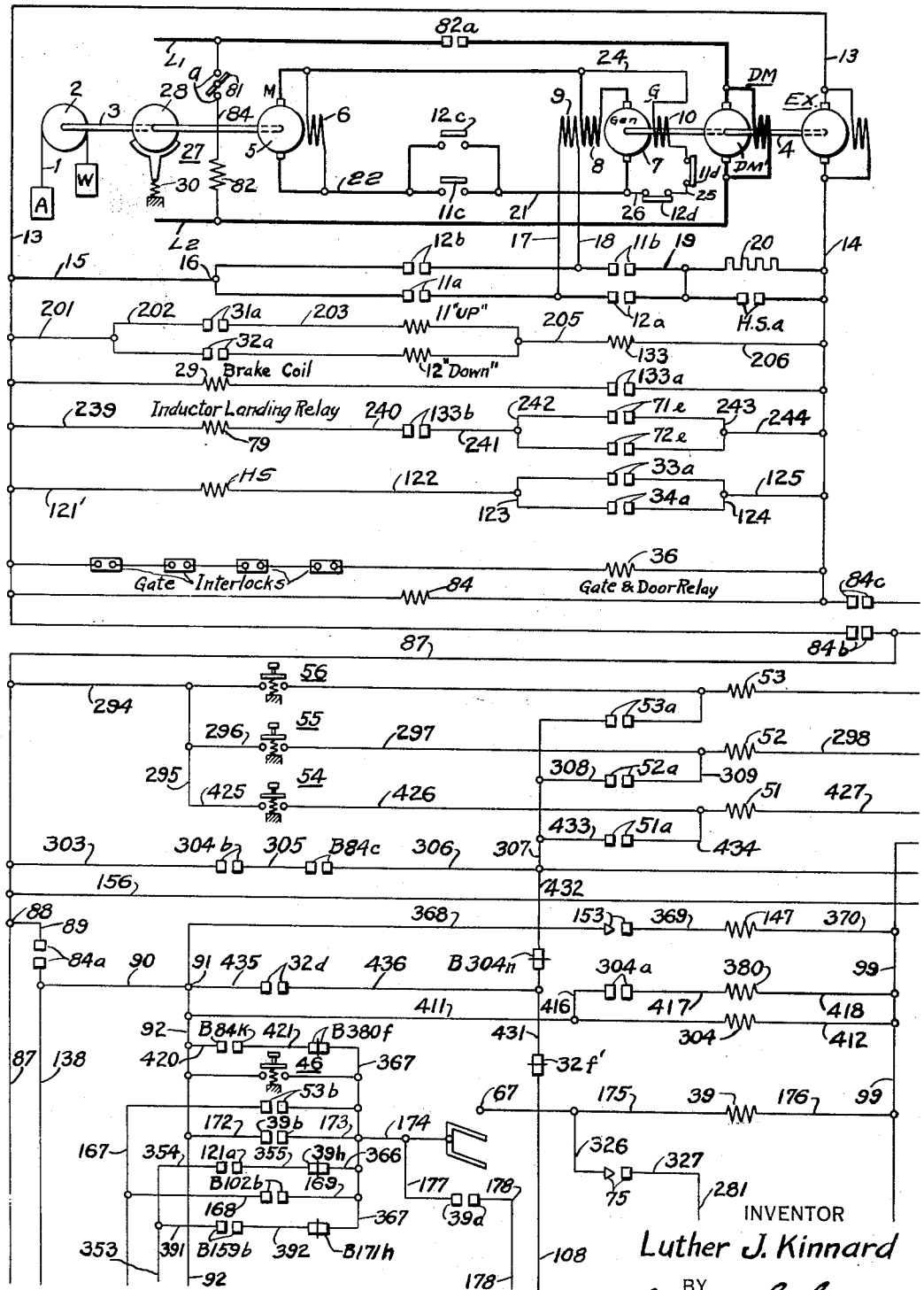
Figure 6:
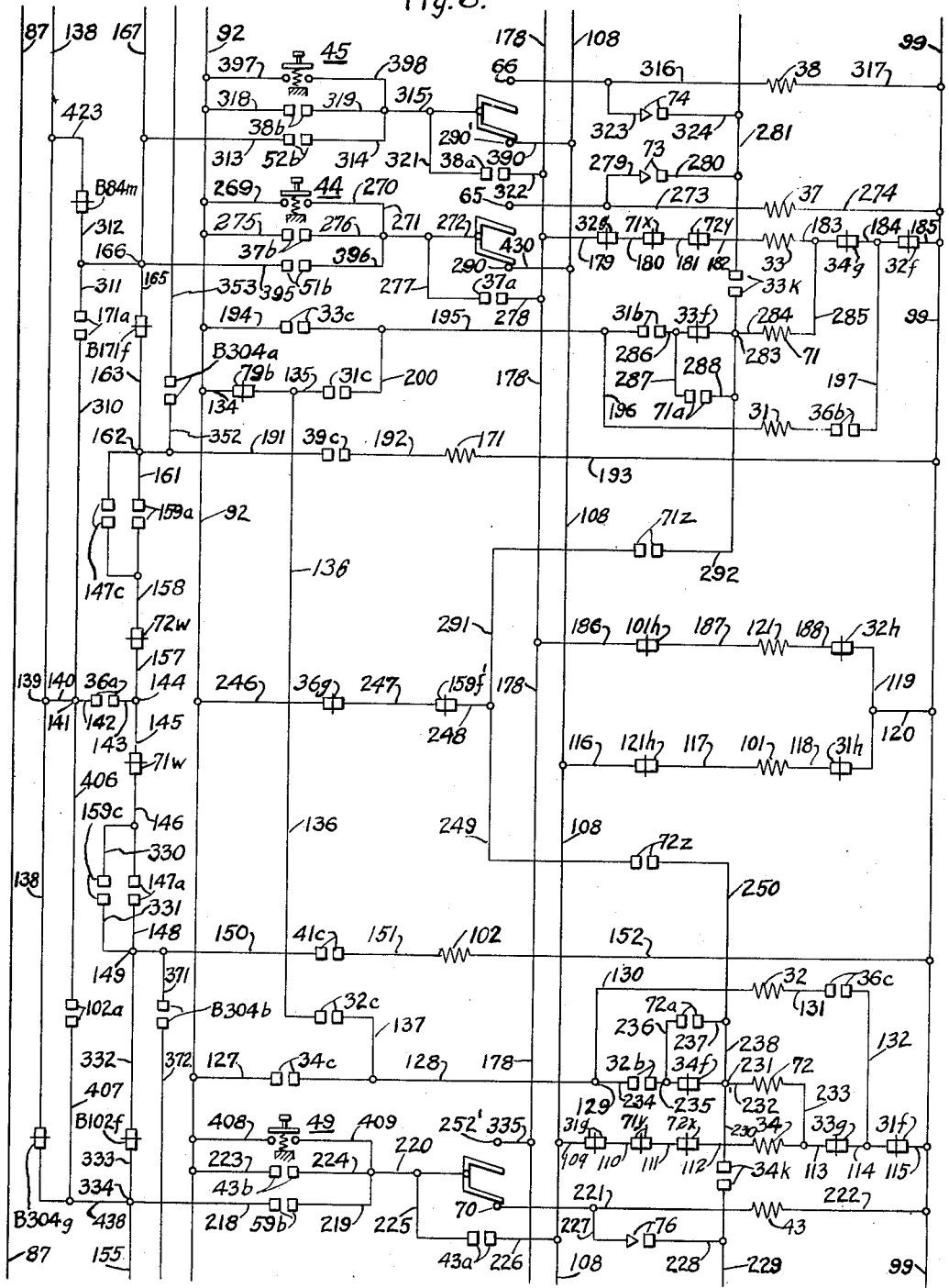
Figure 7:
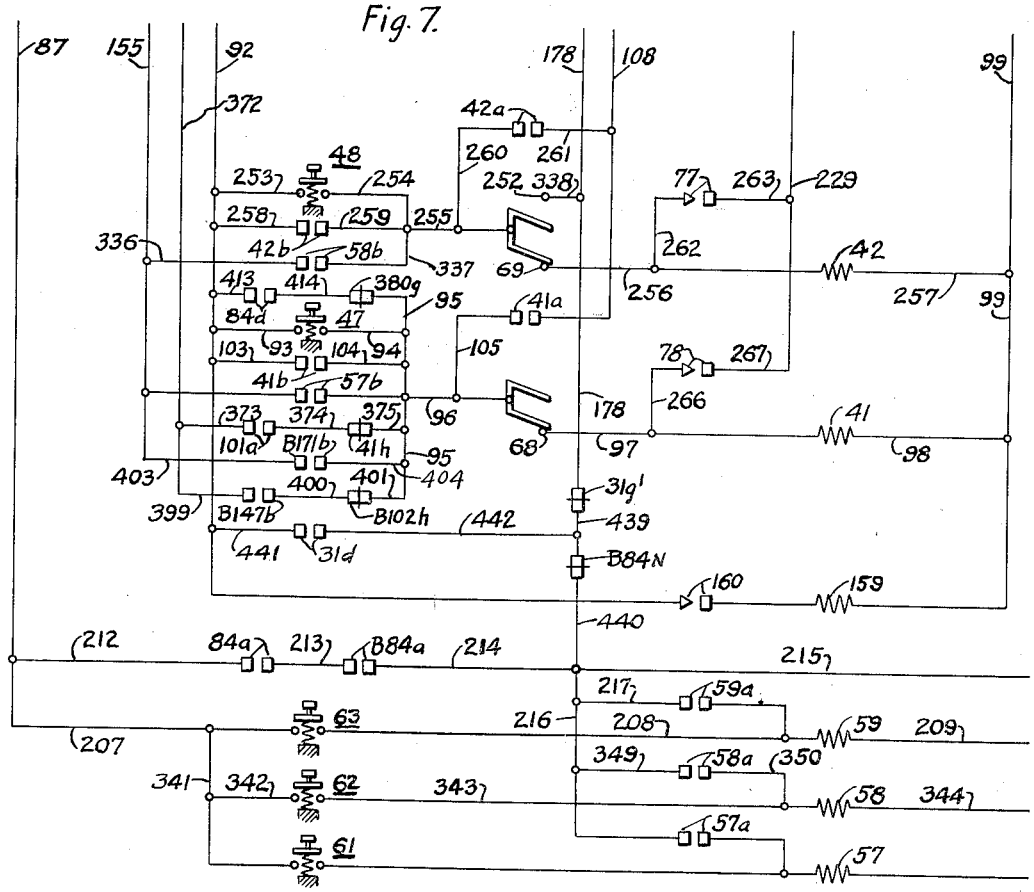

Aug. 8, 1933.    L. J. KINNARD    1,921,679
ELEVATOR CONTROL SYSTEM
Original Filed Jan. 11, 1930    10 Sheets-Sheet 1

INVENTOR
Luther J. Kinnard
BY
Wesley G. Carr
ATTORNEY

Aug. 8, 1933.  L. J. KINNARD  1,921,679
ELEVATOR CONTROL SYSTEM
Original Filed Jan. 11, 1930   10 Sheets-Sheet 2

INVENTOR
Luther J. Kinnard
BY
ATTORNEY

INVENTOR
Luther J. Kinnard
BY
*Wesley G. Carr*
ATTORNEY

Aug. 8, 1933.  L. J. KINNARD  1,921,679
ELEVATOR CONTROL SYSTEM
Original Filed Jan. 11, 1930  10 Sheets-Sheet 8

INVENTOR
Luther J. Kinnard
BY
ATTORNEY

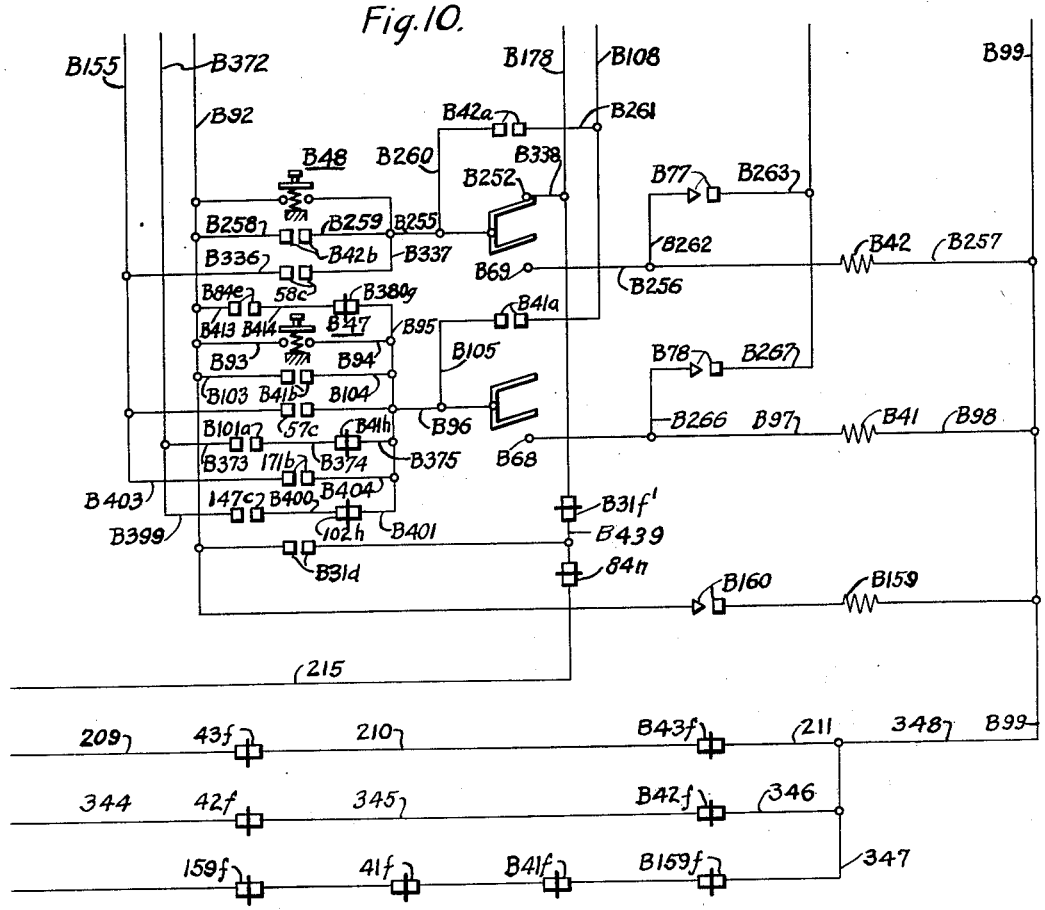

Patented Aug. 8, 1933

1,921,679

UNITED STATES PATENT OFFICE 1,921,679

ELEVATOR CONTROL SYSTEM

Luther J. Kinnard, Pasadena, Calif., assignor to Westinghouse Electric Elevator Company, a Corporation of Illinois Application January 11, 1930, Serial No. 420,131
Renewed December 21, 1932

15 Claims. (Cl. 187—29)

My invention relates to control systems for electrically operated elevators and more particularly to control systems wherein the elevator cars are operated by the passengers or users of the elevator instead of by attendants on the cars.

One object of my invention is to provide a passenger-operated elevator-control system for a plurality of cars wherein the cars will automatically operate in the same manner as they would if handled by experienced car attendants.

Another object of my invention is to provide for so interconnecting the control systems of the cars in a passenger-operated elevator installation that the movement of one car will automatically control the operation of the other cars in such manner as to secure the best results in the operation of the installation as a whole.

A further object of my invention is to provide a passenger-operated control system that will automatically adjust itself, in response to the number of cars in service to operate one car or a plurality of cars, in such manner as to effect the most efficient operation thereof.

It is also an object of my invention to provide a passenger-operated control system that will automatically carry out the following operations.

Although my invention may be applied to an installation embodying a large number of cars, it will be considered as applied to a system embodying two cars, each of which is provided with a motor-generator unit, a hoisting motor and a control system therefor.

If traffic is heavy enough to warrant the operation of both cars, the motor generator unit of each car is set in operation. In accordance with my invention the control systems will be thereby automatically so interconnected that the operation of one car will control the operation of the other car and both cars will act as a two-car collector system. When the cars are operating as a two-car collector system, the normal operation will be such that the cars will be parked at opposite terminal landings when no registered calls are in existence and each car will answer any floor calls that may be registered for the direction in which it is in condition to move.

If one of the cars is called from the terminal at which it is parked in response to the registration of a floor call, opposite terminal calls will be automatically registered for each car; that is, of one car starts from its terminal landing, the other car will also start from its terminal. Thus the cars will move to, and park at, opposite terminals. Each car, in moving to its opposite terminal, will answer all calls in its direction of movement.

While the cars are moving from one terminal to the other, the direction of movement of the respective cars cannot be reversed until they have arrived at the terminal towards which they are moving.

If, for any reason, the gate or door of any one of the cars is held open, that car will not move, and the control system of the other car will be automatically so modified that it will answer all floor calls irrespective of the direction of the calls. However, if the said other car is called from its terminal, it will answer all calls in its direction of movement and complete its trip to the other terminal before it answers any calls in the other direction.

For example, if the said other car starts from the bottom terminal in response to one or more floor calls which may be registered in the up direction, and one or more floor calls in the down direction are registered before it starts or before it has reached the upper terminal, it will start towards the upper terminal but will answer only the up-direction floor calls while it is moving to the upper terminal landing. The down calls which are registered will be maintained until the car arrives at the upper terminal landing. Upon the arrival of the car at the upper terminal landing, the down calls will be transferred to down-direction floor relays for the respective floors from which the calls are registered. The car will then run to, and park at, the lower terminal landing, answering all the down calls in the order of the floors as it makes its down trip.

During the operation of the cars as a two-car collector system, the traffic conditions may be such that both cars may arrive at the same terminal landing at the same time. If the cars are both at the same terminal, and the gates and doors of both cars are held open, the cars will stay at this terminal landing until the gate and door of one of them are closed. In this case, the car first to have its gate and door closed will move automatically to the other terminal landing, at which it will park so long as no calls are registered, provided the gate or door of the other car is still held open. The control system, however, is so arranged that the moving car will answer all calls in its direction of travel as it goes to the other terminal.

If the gates and doors of both cars are closed, when both cars are parked at the same terminal landing with no floor calls registered, one of the cars will move automatically to the other terminal landing and will park at that landing while the other car will stay where it is. Each car will now be disposed to answer all floor calls in the direction in which it is conditioned to move.

As stated above, if both cars are parked at the same terminal landing with their gates and doors open, and the gate and door of one car are closed, the closed car will be dispatched towards the other terminal and will answer any calls that are registered in its direction of movement. If, after the first closed car has started, the gate and the door of the second car closed, and a car push button therein is operated to set up a call for a floor intermediate the terminal landings, then the second car will also start towards the terminal landing to which the other car is moving.

After the second car starts to follow the first car, the control system will be so modified that the first car will answer only those calls which were registered before the second car started, and the second car will answer all the calls registered after it starts. Therefore, the car last to start will be caused to stop at every floor from which a call in the direction of movement of the car is registered subsequent to its starting. Accordingly, the car first to start will arrive at its terminal landing ahead of the car last to start. Immediately upon the arrival of the first car at the terminal landing, a floor call for the other or opposite terminal landing will be registered automatically to cause it to be dispatched to said opposite terminal. Therefore, the control systems of the cars will tend to keep them moving in opposite directions and to cause them to be parked at opposite terminals when they are not answering registered calls.

If traffic conditions are light and it is not necessary to employ both cars, the motor-generator unit of one car may be shut down, so that the other car may act as a single-car-collector system. In this case, the other car will be disposed to answer all floor calls. The control system, however, is so arranged that the active car will answer all calls in a given direction in the order of the floors and not in the order of the calls, before any floor calls in the opposite direction are answered, provided the opposite-direction calls are registered last.

If a passenger standing at a floor landing desires to call a car to that floor, it is only necessary for him to operate a push-button corresponding to the direction in which he desires to go. The car which is in condition to answer this call will move to stop at and remain at, that floor for a length of time sufficient to permit the passenger to open the gate and door and enter the car. After the passenger enters the car, and the gate and door are reclosed, if he presses a push-button in the car corresponding to the particular floor to which he desires to go, the car will move to that floor. When the car arrives at that floor it will stop so that the passenger may leave the car. After the passenger leaves the car and the gate and door close, the car will continue on its way, stopping at each floor from which there may be a call registered, until it finally arrives at a terminal landing.

Other objects of my invention will, in part, be obvious and will, in part, appear hereinafter.

Figure 11:
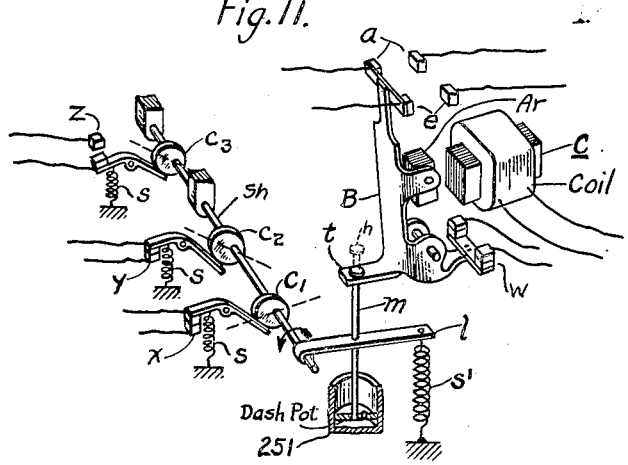
Figure 8:
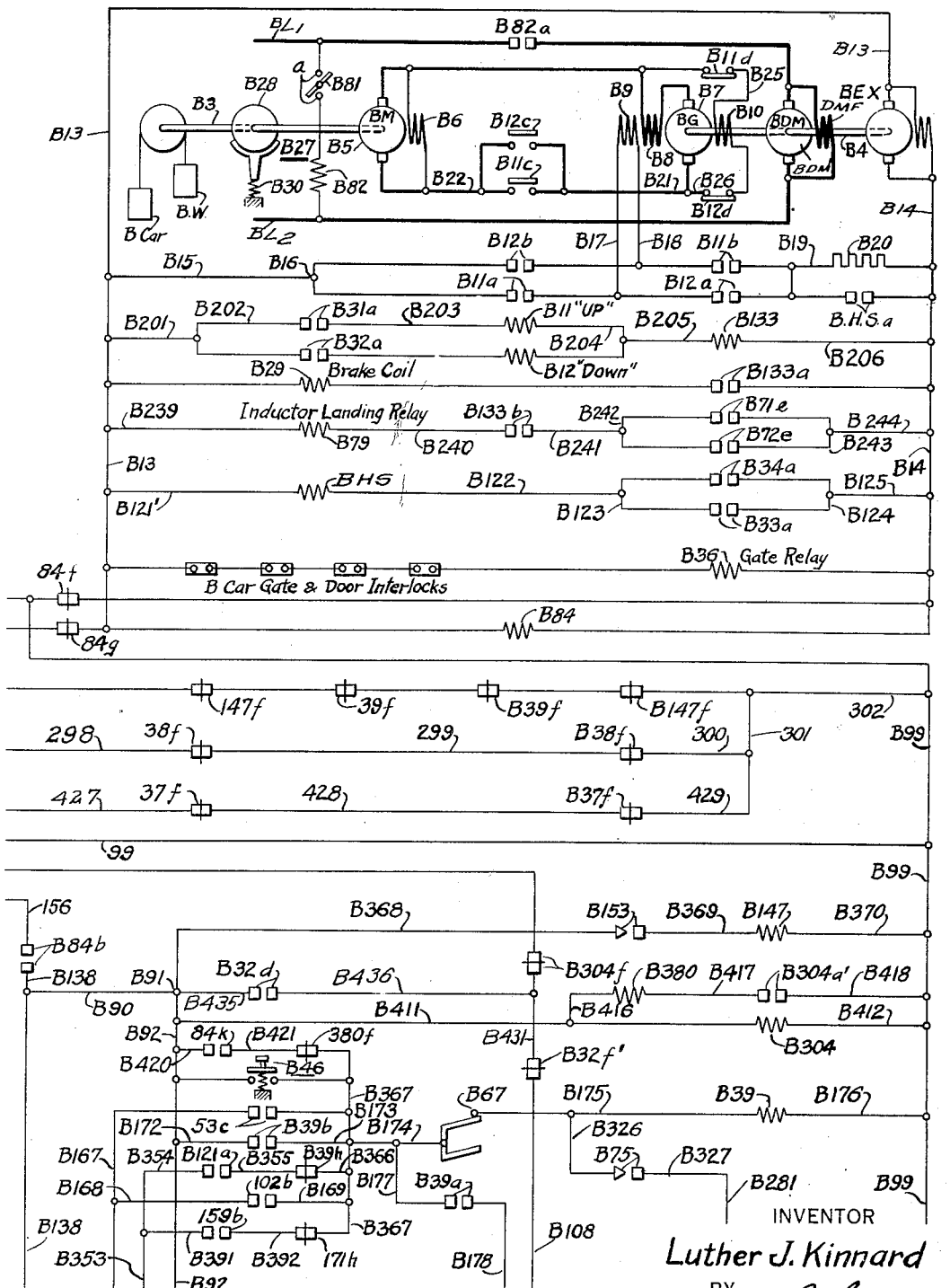
Figure 9:
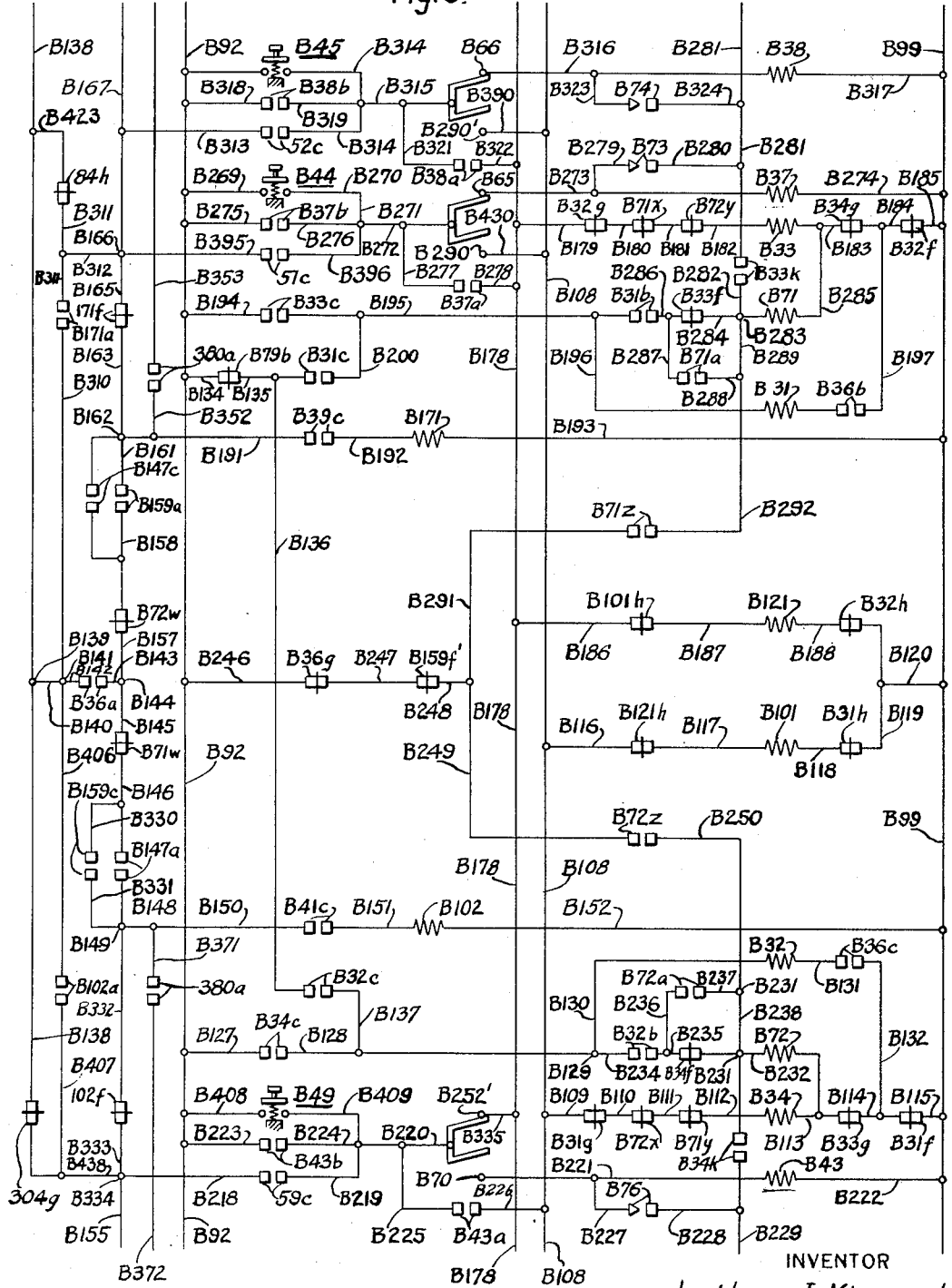

For a better understanding of the invention, reference may be had to the following description taken in conjunction with the accompanying drawings, in which:

Figures 1, 2, 3 and 4 collectively constitute a full-line diagrammatic representation of a passenger-operated elevator-control system embodying my invention;

Figs. 5, 6, 7, 8, 9 and 10 collectively constitute a straight-line diagram of the circuits and apparatus included in Figs. 1, 2, 3 and 4; and Fig. 11 is a schematic illustration of a direction-preference relay embodied in the control system shown in Figs. 1 to 10, inclusive.

For the sake of simplicity, so that the various circuits may be traced easily, my invention will be described in connection with the straight-line diagram embodied in Figs. 5 to 10, inclusive, of the drawings, and, when possible, the reference numerals that are applied to the straight-line drawings will be applied also to the corresponding parts and circuits in the full-line drawings to permit ready reference to either set of drawings.

In the drawings, I have illustrated an elevator system embodying two cars A and B that are disposed to operate past a plurality of floors. As shown, they are adapted to serve an upper terminal, a lower terminal and two intermediate floors.

Inasmuch as the cars A and B and the means for operating them are similar, only car A will be described in detail and car B, with its accessories, will be given similar reference characters with the prefix "B".

As an aid in understanding the system, the following list of switches, relays and other parts for car A is given:

M hoisting motor.

G generator to supply energy to hoisting motor.

9. Separately excited field winding for generator whereby operation of generator is controlled.

10 demagnetizing field winding for generator.

DM motor for driving generator.

L1 and L2 conductor for supplying energy from outside source to operate driving motor DM.

EX exciter driven by driving motor DM for supplying energy to field windings of hoisting motor and generator and also to control circuits through conductors 13 and 14.

11 up-direction switch for controlling generator to cause the hoisting motor to move car A upwardly.

12 down-direction switch for controlling generator to move car A downwardly.

27 brake for stopping car A.

31 up-direction relay for controlling up-direction switch 11.

32 down-direction relay 32 for controlling down-direction switch 12.

33 up-control relay for controlling up-direction relay 31.

34 down-control relay for controlling down-direction relay 32.

HS high-speed relay also controlled by relays 33 and 34.

37, 38, 39 up-direction floor relays for energizing up-control relay 33.

41, 42, 43 down-direction floor relays for energizing down-control relay 34. The floor relays also energize contact segments on a floor selector to stop the car at the correct floor.

44, 45, 46 up-direction push buttons in car for energizing "up" floor relays.

47, 48, 49 down-direction push buttons in car for energizing "down" floor relays.

51, 52, 53 "up" corridor relays for energizing "up" floor relays.

54, 55, 56 up-direction push buttons at landings for energizing "up" corridor relays.

57, 58, 59 "down" corridor relays for energizing door floor relays.

61, 62, 63 down-direction push buttons at landings for energizing "down" corridor relays.

64 floor selector for connecting circuits according to travel of car.

71 up-direction preference relay for stopping, retaining direction and restarting car on "up" trip.

72 down-direction preference relay for stopping, retaining direction and restarting car on "down" trip.

79 inductor relay on car for stopping car.

121 "up" call relay to insure car goes to "up" terminal.

101 "down" call relay to insure car goes to "down" terminal.

171 top floor terminal relay to park car at upper terminal.

102 bottom floor relay to park car at lower terminal.

304 and B304 dual operating relays for interconnecting control circuits with both cars in operation.

380 and B380 relays for conecting certain circuits with only one car in operation.

81 starting switch in car A for energizing starting relay 82.

82 starting relay for setting motor-generator set into operation.

The car A is suitably suspended upon a cable 1 that passes over a hoisting drum 2 to a suitable counterweight W. The hoisting drum 2 is directly coupled to the armature 5 of a hoisting motor M, the field winding 6 of which is connected, for constant-voltage energization, to a source of power designated as the supply conductors 13 and 14.

A variable-voltage system of control is provided for operating the hoisting motor M, wherein the armature 5 of the hoisting motor is connected in loop circuit with the armature 7 of a generator G. The generator is provided with a cumulative series field winding 8 and a separately excited field winding 9. A demagnetizing field winding 10 is provided for reducing the residual magnetism of the generator to approximately zero value when the separately-excited field winding 9 is deenergized.

The armature 7 of the generator G is directly coupled to, and is driven by, a driving motor DM illustrated as being of the shunt-wound type having its armature DM' and its field winding DMF connected in shunt relation to a source of supply designated by the supply conductors L1 and L2.

An exciter EX is provided for supplying power to the supply conductors 13 and 14 for the field winding 6 of the hoisting motor, the separately-excited field winding 9 of the generator G and the circuits of the control system. The exciter EX is directly coupled to, and is driven by, the driving motor DM through a shaft 4.

The direction and speed of the hoisting motor M may be suitably controlled by controlling the direction and value of the excitation current that is supplied to the separately excited field winding 9 of the generator G.

The direction of the excitation current for the field winding 9 may be suitably controlled by means of an up-direction switch 11 and a down-direction switch 12, while the value of the current supplied to the field winding may be controlled by means of a high-speed relay HS.

For instance, if the up-direction switch 11 is energized, it disconnects the demagnetizing field winding 10, supplies energy from the supply conductors 13 and 14 to the separately excited field winding 9 of the generator G, and connects the hoisting motor M to the generator G to cause the car A to travel upwardly.

The closing of the contact members a and b on the up-direction switch 11 completes a power circuit for the field winding 9 that extends from the power supply conductor 13, through conductor 15, junction point 16, contact members a of the switch 11, conductor 17, the field winding 9, conductor 18, contact members b of the switch 11, conductor 19, and an accelerating resistor 20 to the power-supply conductor 14.

The closing of the contact members c on the switch 11, completes a power circuit for the motor M that extends from the armature 7 of the generator G through conductor 21, contact members c of the switch 11, conductor 22, the armature and the shunt field winding 6, connected in parallel-circuit relation, and the series field winding 8 back to the armature 7 of the generator.

When the up-direction switch 11 is deenergized for the purpose of stopping the car, the hoisting motor M is disconnected from the generator G; the separately excited field winding 9 is disconnected from the supply conductors 13 and 14; and the demagnetizing field winding 10 is connected across the armature 7 of the generator G.

The circuit for the demagnetizing field winding 10 extends from the armature 7 of the generator G, through the series field winding 8, conductor 24, demagnetizing field winding 10, contact member d of the up direction switch 11, conductor 25, contact members d of the down direction switch 12 and conductor 26, back to the armature 7 of the generator.

If the down-direction switch 12 is closed, the hoisting motor M is connected to the generator G; the separately excited field winding 9 is reversed and connected to the power-supply conductors 13 and 14; and the demagnetizing field winding 10 is disconnected from the armature 7 of the generator. Since the field winding 9 is reversed, the current in the winding flows in the opposite direction to that in which it flows when the up-direction switch 11 is closed. Accordingly, the voltage developed by the generator is reversed, and the motor is caused to drive the car downwardly, when the down direction switch 12 is closed.

The energizing circuit for the separately-excited field winding 9, when reversed, extends from supply conductor 13, through conductor 15, contact members b of the down-direction switch 12, conductor 18, field winding 9, conductor 17, contact members a of the switch 12 and the accelerating resistor 20, to the supply conductor 14.

In order to stop the elevator car A when the hoisting motor M is disconnected from the generator G, a brake 27 is provided and disposed for operation upon a brake drum 28 that is mounted on the drive shaft 3. As shown, the brake 27 is applied by a spring 30 when the motor is disconnected from its source of power and is released by a solenoid 29 when power is applied to the motor. The solenoid 29 is controlled by a brake relay 133 the coil of which is included in the circuit to the up and down-direction switches 11 and 12.

In order that the up and down-direction switches 11 and 12 may be closed when it is desired to start the car, up and down-direction relays 31 and 32, respectively, are provided. These relays, when closed, operate to establish energizing circuits for the respective actuating coils of the direction switches 11 and 12.

An up-control relay 33 and a down-control relay 34 are provided for energizing the direction relays 31 and 32 in starting the car and for energizing a high-speed relay HS to cause the car to travel at high speed after it is started. The circuit for the high-speed relay HS, when energized, extends from the supply conductor 13, through conductor 121', the coil of relay HS, conductor 122, the contact members $a$ of either the relay 33 or the relay 34 and conductor 125, to supply conductor 14.

The car A has associated with it a plurality of up-direction floor relays 37, 38 and 39 for energizing the up-control relay 33, and a plurality of down-direction floor relays 41, 42 and 43 for energizing the down-control relay 34.

When a floor relay is energized to close a control relay to run the car to a floor, it also supplies energy to one of a pair of contact segments on a floor selector 64, which contact segments are disposed to be closed by the arrival of the car at the corresponding floor to thereby energize a stopping relay 71 or 72, to effect the stopping of the car at that floor, as will be more fully explained later.

The floor relays are, in turn, energized by means of passenger-operated push buttons that are located in the car and at the floor landings. Therefore, when a floor relay is energized by the pressing of a push button, it causes a car to move to the floor corresponding to the pressed push button and then stops it at that floor.

It will be noted that the normally open contact members $b$ of the floor relay 39 are connected to the armature of that relay by a spring that permits the armature to continue its upward movement after the contact members $b$ close. It will also be noted that the normally closed contact members $h$ on the relay 39 are loosely mounted on the armature and that the armature is provided with a shoulder that will raise the contact members $h$ after the armature has moved upwardly a short distance. This construction is provided so that, when the relay 39 is energized by a circuit extending through its normally closed contact members $h$, as is sometimes necessary, its normally open contact members $b$ will close and complete a self-holding circuit for itself before the contact members $h$ open.

The floor relays 41, B39 and B41 are constructed with their contact members $b$ and $h$ mounted the same as on the relay 39.

The push buttons disposed in the car A to be operated by the passengers in order to move the car to, and stop it at, any selected floor are designated as 44, 45 and 46 for the up direction and 47, 48 and 49 for the down direction. The car push buttons are connected in the circuits for the coils of the floor relays corresponding to the car A.

The push buttons disposed at the corridor landings for operation by waiting passengers to register calls for bringing the cars to them are designated as 54, 55 and 56 for the up direction and 61, 62 and 63 for the down direction.

Only one set of floor buttons is provided. In order to avoid the necessity of having a set of floor push buttons for each car, they are connected to energize corresponding corridor relays that, in turn, selectively energize the floor relays of the car that should next reach that floor in the corresponding direction. The up floor push buttons 54, 55 and 56 are connected for selectively energizing up corridor relays 51, 52 and 53 while the down push buttons 61, 62 and 63 are connected for selectively energizing down corridor relays 57, 58 and 59.

When both cars are in service, the up corridor relays 51, 52 and 53, when energized, will be connected either through contact members 65, 66 and 67 on the floor selector 64 to the up floor relays for car A or through contact members B65, B66 and B67 on the floor selector B64 to the up floor relays for car B, depending upon the position and the direction of travel of the cars.

Similarly, the down corridor relays 57, 58 and 59, when energized, will be connected, through contact members 68, 69 and 70 on the floor selector 64, to the down floor relays for car A or, through the contact members B68, B69 and B70 on the floor selector B64, to the down floor relays for car B, depending upon the position and direction of operation of the cars.

The floor selector 64 for connecting certain circuits to the stopping relays, the floor relays, etc., of car A in accordance with the movement of the car may be located at any suitable point, for example, in the penthouse of the elevator shaft. As shown, the selector is provided with two sets of contact segments that are disposed to be closed by brushes 35 and 35$a$ and a plurality of switches that are disposed to be operated by a pair of pins 35$b$ and 35$c$. The brushes and pins are seated upon a movable arm MA that is operated in accordance with the movements of the car A by means of a screw S which is driven by some part of the operating mechanism of the car.

The contact segments 76, 77 and 78 under the brush 35 may be energized by the down floor relays so that they will effect the stopping of the car on a down trip as they are closed by the brush 35, while the contact segments 73, 74 and 75 under the brush 35$a$ may be energized by the up floor relays to stop the car on an up trip, as they are closed by the brush 35$a$.

The contact segments 76, 77 and 78, as well as the segments 73, 74 and 75, are disposed in such position on the floor selector with reference to the floor landings as to provide "slow-down" zones within which the car may be decelerated so that it may be stopped exactly level with the floors.

The contact segments 153 are disposed to be engaged by the brush 35 to energize a top terminal landing relay 147 when the car A is at the upper terminal. Similarly, the contact members 160 are disposed to energize a bottom terminal landing relay 159 when the car A is at the lower terminal. The landing relays 147 and 159 prepare certain circuits to cause the cars to operate in a certain order under certain conditions.

The pin 35$b$ is disposed to consecutively engage small projections on the rear ends of the switches under it and thereby open the contact members 68, 69 and 70 for deenergizing the down floor relays 41, 42 and 43 and to close contact members 252 and 252' for preparing certain circuits for the floor relays under certain conditions, as the car travels downwardly. As the car travels upwardly, the position of these switches is reversed by the pin 35$b$.

The pin 35$c$ is disposed to engage small projections on the switches under it to consecutively open contact members 290 and 290' to prevent the operation of certain floor relays under certain conditions and to close contact members 67, 66 and 65 to prepare the floor relays 39, 38 and 37 for energization as the car travels downwardly. Obviously, as the car travels upwardly, the position of the switches will be reversed.

It should be noted that the switches under the pins 35b and 35c are placed upon the floor selector in such position that they will be moved to open position as the car comes into a floor and, as the car leaves the floor, they will be moved to close the opposite contact members.

In stopping the car at a landing, it is desirable to first reinsert the resistor 20 in the generator field to slow down the car and then, as the car slows down to stop at a landing, to cut off the power and apply the brake to bring it to a standstill exactly level with the landing. In the present system, the resistor 20 is reinserted in the generator field when the control relays 33 and 34 are deenergized as the car enters the slow-down zone. It should be recalled that the direction relays and the direction switches will not be deenergized to cut off the power as soon as the control relays 33 and 34 are deenergized because the direction relay circuit through the control relays has been paralleled by a holding circuit through the contact members of the inductor relay 79. Therefore, after the control relays are deenergized, the direction relays remain energized until the contact members of the inductor relay 79 are opened.

In order that the up-control relay 33 may be deenergized to initiate slow down of the car A as it enters slow-down zone for any floor for which a call has been registered, the stopping and up-direction preference relay 71 is provided. Similarly, the stopping and down-direction preference relay 72 is provided for deenergizing the down-control relay 34 as the car descends to any floor from which a call is registered.

The direction-preference relay 71 is energized as the car A enters the slow-down zone of each of the different floors for which a call is registered, by the brush 35a moving over and closing one of the energized contact members 73, 74 and 75 on the floor selector 64. These contact members are so arranged that a momentary circuit is established for the relay 71 when the car enters the slow-down zone for any floor, provided the up floor relay for that floor has been energized to supply current to its corresponding contact segment. Upon closing, the relay 71 establishes its own holding circuit.

In like manner, the down-direction preference relay 72 will be energized by the brush 35 engaging and closing one of the energized contact segments 76, 77 and 78 on the floor selector 64 as the car enters the slow-down zone while descending to any floor for which a down floor call may be registered. The relay 72 is so arranged that, when momentarily energized, it closes and establishes its own holding circuit.

The relays 71 and 72 are called "direction-preference relays" because, in addition to serving to energize the inductor relay 79 to stop the car, they also serve to restart the car, after a stop has been made, by restoring the floor relays ready for the next operation. When all the calls in the up direction have been answered, the up-direction preference relay 71 cannot be reenergized unless another up call is registered before the car reverses. This is also true of the down-direction-preference relay 72, for the down-direction calls.

In order that the car A, after being decelerated, may be stopped on a level with any floor for which a call is registered, an inductor landing relay 79 is provided. This relay is disposed to be energized whenever the one or the other of the direction-preference relays 71 and 72 is energized. As the car slows down to a position approximately level with the floor, the inductor relay 79 passes an inductor plate and is thereby operated to deenergize either the up-direction relay 31 or the down-direction relay 32, depending upon whether the car is moving in the up or in the down direction. When the direction relays 31 and 32 are deenergized, they open the direction switches 11 and 12 to cut off the power and, at the same time, apply the brake to stop the car exactly level with the landing.

In order that, when both cars A and B are in service and one of them is started in either direction, it shall continue to travel in that direction as each stop is made to take on or let off passengers until it arrives at the opposite terminal, I have provided the car A with an up call relay 121 and a down call relay 101 and car B with an up call relay B121 and a down call relay B101. As previously stated, the direction-preference relays condition the cars to restart after a call has been answered as long as further calls exist, but the call relays insure that the cars will keep on going until they land at the terminals in the direction in which they start even though no further registered calls are in existence.

The car A is provided with a top floor terminal relay 171 and a bottom floor relay 102. Car B is provided with a similar pair of relays B171 and B102. When both cars are in service, these floor-terminal relays cause them to park at opposite terminals and, at the same time, control the energization of transfer conductors 155 and 167 for car A and conductors B155 and B167 for car B in such manner that the cars, when moving in one direction, will not answer calls in the other direction. For instance, if car A receives a down call while it is at the top floor, it will start down to the bottom floor and car B will start up to the top floor. While car A is going down, it will answer all down calls but no up calls, while car B will answer all up calls but no down calls.

Dual operating relays, 304 for car A and B304 for car B, are provided to interconnect certain control circuits of the cars when both cars are in operation so that the cars will follow certain routines. When only one car is in service, the dual operating relay of the other car is not energized and it, therefore, prevents the completion of certain circuits that would cause the operating car, after starting in one direction, to make a trip to the terminal in that direction.

Associated with, and energized by, the relays 304 and B304 are relays 380 and B380 for connecting certain circuits when only one car is in operation. It will be noted that the relays 380 and B380 are provided with dash pots that prevent their normally closed contact members g and f from opening quickly when the relays are energized. The use of the dash pots permits the formation of certain holding circuits between the energization of the relays 380 and B380, and the opening of their contact members g and f.

As a matter of safety, it is desirable to prevent either one of the control relays 33 and 34 from being energized to start the car A until the gate and the doors are closed. Therefore, a gate and door relay 36 is provided to hold open the circuits of the control relays 33 and 34 until the gate and doors are closed. Gate and door interlocks are provided to energize the relay 36 in the usual manner when the gate and doors are closed and to deenergize the relay when the gate or a door is open.

The control systems of the cars A and B are so arranged that, when the systems are operating as a two-car collector control system, the control system of one car functions to govern the control system of the other car. Furthermore, these control systems are so arranged that either of the cars may be operated independently as a single car-collector system.

The operation of the cars as a two-car-collector-control system will be described first. In describing the various steps of operation, it will be assumed that the car A is parked at the upper terminal landing and that car B is parked at the lower terminal landing. The first step in the operation of the system requires that the motor-generator units of both cars be placed in operation.

To start the motor-generator unit for car A, a starting switch 81 disposed in that car is actuated to its closed position. The closing of the starting switch 81 completes a circuit for energizing the actuating coil of a starting relay 82 to connect the driving motor DM to the supply conductors L1 and L2, which circuit extends from one of the power-supply conductors L1, through the contact members of the starting switch 81, conductor 84 and the actuating coil of the starting relay 82, to the supply conductor L2.

Energization of the starting relay 82 completes a circuit for the driving motor DM that extends from the supply conductor L1, through the armature and the shunt field windings of the motor and the contact members of the starting relay, to the supply conductor L2.

Under the assumed conditions, when the motor-generator unit for car A starts, the exciter EX supplies power to the supply conductors 13 and 14, and a circuit-connecting relay 84 is energized to provide a certain set up of the control circuits of car A that will enable that car to function correctly. The circuit for energizing the relay 84 extends from conductor 13, to the actuating coil of the relay 84, through the conductor 14. When the relay 84 is energized, its contact members $a$, $b$, $c$, $d$, $e$ and $k$ are closed to energize the control circuit for car A.

In order to start the motor-generator unit for car B, a starting switch B81 disposed in car B is closed to complete a circuit for energizing a starting relay B82, which circuit extends from a supply conductor BL1, through the contact members of the starting switch B81 and the actuating coil of the starting relay B82, to the power-supply conductor BL2.

The closing of the starting relay B82 completes a circuit for the driving motor BDM to operate the motor-generator unit, which circuit extends from the supply conductors BL1 through the contact members of the starting relay B82 through the armature and the shunt field windings in parallel and thence, to the supply conductors BL2.

When the motor-generator unit for the car B starts, the exciter BEX supplies current for the supply conductors B13 and B14 and, at the same time, automatically energizes a circuit-connecting relay B84. The energizing circuit for the coil of the relay B84 extends from control-circuit conductor B13, through the actuating coil of the relay B84, to a control-circuit conductor B14. When the relay B84 is energized, its contact members $a$, $b$, $c$, $e$ and $k$ are closed to connect the control circuits of car B in such manner that the car may be operated under the assumed conditions. With both cars in service, they are so interconnected by the relays 84 and B84 that their control circuits are supplied with power from the exciter of car A only, because the normally closed contact members $f$ and $g$ of the car A relay 84 are open.

After the motor-generator set for car B is started, the door and gate for car B are closed.

Assume now that a passenger enters the car A as it stands at the top floor, closes the gate and door and presses the car push button 47 to cause the car to move to, and stop at, the bottom terminal.

The closing of the door and gate closes the door and gate interlocks, thereby completing a circuit to energize the door and gate relay 36 to close its contact members $a$, $b$ and $c$ to permit operation of the car A, which circuit extends from supply conductor 13, through the door and gate interlocks and the coil of relay 36, to supply conductor 14.

Stated briefly, the pressing of the button 47 energizes the floor relay 41, which, in turn, causes the energization of the down control relay 34, the down-direction relay 32, and the down-direction switch 12 to complete circuits for supplying current to the generator field and for connecting the hoisting motor to the generator to start the car downwardly. The energized floor relay 41 also closes a circuit to supply current to one of the contact segments 78 on the floor selector for operating relays to stop the car when it arrives at the first floor.

Stated in detail, the pressing of the push button 47, by reason of the position of the cars, completes a circuit for energizing the actuating coil of the down floor relay 41 of car A, which circuit extends from supply conductor 13, through the contact members $b$ of the relay 84, control circuit conductor 87, junction point 88, conductor 89, contact members $a$ of the relay 84, conductor 90, junction point 91, conductors 92 and 93, the contact members of the first-floor car push-button 47, conductors 94, 95 and 96, contact members 68 of the floor selector 64, conductor 97, the actuating coil of the relay 41, control-circuit conductors 98 and 99, control-circuit conductor B99 and contact members $c$ of the relay 84, to control-circuit supply-conductor 14.

The closing of the contact members $b$ on the floor relay 41 completes a self-holding circuit for that relay extending from control-circuit conductor 92, through conductor 103, contact members $b$ of the relay 41, conductors 104, 95 and 96, the contact members 68 of the floor selector, conductor 97, the coil of the relay 41, and conductor 98, to the control circuit conductor 99, which is energized. The relay 41 will remain energized until the pin 35b on the floor selector 64 opens the contact members 68 when the car reaches the first floor.

The closing of the contact members $b$ on the down floor relay 41 also energizes one of the contact members 78 on the floor selector 64 so that when the car A enters the slow-down zone for the bottom floor and thereby causes the brush 35 to close the contact members 78, a circuit will be completed for energizing the down preference relay 72 to stop the car at the bottom floor.

The closing of the contact members $a$ of the floor relay 41 completes an energizing circuit for the down call relay 101 to cause the car A to make a trip to the lower terminal, which circuit extends from the energized conductor 108, through conductor 116, normally closed contact members $h$ of an up call relay 121, conductor 117, the coil of relay 101, conductor 118, normally closed contact members $h$ of the relay 31 and conductors 119 and 120, to the control circuit conductor 99.

The opening of the contact members $h$ on the energized down call relay 101 prevents the energization of the up call relay 121 during the down trip of the car A.

It should be noted that down call relay 101 for car A will be energized whenever any one of the down floor relays 43, 42 or 41 is energized, because the contact members $a$ of each of the down floor relays for car A are connected to the common conductor 108 which supplies energy to the coil of the relay 101.

The down call relay 101, if energized by either of the down floor relays 42 or 43, will close its contact members $a$ to complete a circuit for energizing the down floor relay 41 for the bottom floor to thereby cause the car A to go to the bottom floor provided it starts on a down trip when car B is also in service. Thus, it will be seen that the down floor relay 41 for the lower terminal may be energized either by the down car push button 47 or by the down call relay 101. In the present instance, the floor relay 41 has been energized by the push button 47 instead of by the down call relay 101 and, therefore, the present energization of relay 101 serves no purpose except to prevent the energization of the up call relay 121 for car A while it is making a down trip.

The closing of the contact members $a$ on the down floor relay 41 also completes an energizing circuit for the down control relay 34 which extends from the energized conductor 96, through conductor 105, the contact members $a$ of the relay 41, down-direction floor-relay circuit conductor 108, conductor 109, normally closed contact members $g$ of the up-direction relay 31, conductor 110, normally closed contact members $y$ of the up-direction-preference relay 71, conductor 111, normally closed contact members $x$ of the direction-preference relay 72, conductor 112, the actuating coil of the down control relay 34, conductor 113, normally closed contact members $g$ of the up-direction control relay 33, conductor 114, normally closed contact members $f$ of the up-direction relay 31 and conductor 115, to the control circuit conductor 99, which is energized.

It should be noted here that the down floor relay circuit conductor 108 is common to all the down floor relays of car A and that it is in an energized condition when any one or all of the down floor relays are energized, so that it will in turn, control or supply current to the down call relay 101 and the down control relay 34 to move the car downwardly whenever any down floor relay for car A is energized.

The closing of the contact members $c$ on the energized control relay 34 completes an energizing circuit for the down-direction relay 32 which extends from the car-button-control-circuit conductor 92, through conductor 127, contact members $c$ of the control relay 34, conductor 128, junction point 129, conductor 130, the actuating coil of the down-direction relay 32, conductor 131, contact members $c$ of the gate relay 36, conductors 132 and 114, the normally closed contact members $f$ of the up-direction relay 31 and conductor 115, to the car A control-circuit conductor 99.

The closing of the contact members $a$ on the energized down-direction relay 32 completes a circuit for energizing the down-direction switch 12 and the brake-releasing relay 133 for starting the car, which circuit extends from supply conductor 13, through conductor 201, the contact members $a$ of down-direction relay 32, the coil of down-direction switch 12, conductor 205, the coil of brake relay 133 and conductor 206, to supply conductor 14.

The energization of the down-direction switch 12 and the brake relay 133 causes them to supply the hoisting motor with power and thus release the brake 27 from the brake drum 28, as previously described, thereby starting the car downwardly.

The closing of the contact members $c$ on the energized down-direction relay 32 also completes a self-holding circuit for itself which circuit is in parallel with the contact members $c$ of the floor relay 34 and extends from the car-button-control-circuit conductor 92 through conductor 134, normally closed contact members $b$ of the inductor landing relay 79, conductors 135 and 136, the contact members $c$ of the relay 32 and conductor 137, to the conductor 128. The provision of the parallel holding circuit prevents the direction relay 32 from being deenergized when the contact members $c$ on the control relay 34 are opened, until the circuit through the contact members $b$ of relay 79 is opened.

Therefore, when the car enters the slow down zone for a floor at which a stop is to be made, the control relay 34 will be deenergized by the energization of the down preference relay 72 to open one of the parallel circuits to the coil of relay 32 and, at the same time, to insert the resistor 20 in the circuit of the generator field winding 9 for slowing down the car. When the car slows down to stop at the landing, the inductor floor relay 79 will open its contact members $b$ to break the self-holding circuit of the direction relay 32 and thus cause the power to be cut off the hoisting motor and the brake to be applied, thereby bringing the car to a standstill at the landing.

Returning to the energization of the floor relay 41, the closing of its contact members $c$ completes an energizing circuit for the bottom terminal relay 102 of car A to cause car B to go to the top landing and to cause car A to answer only down calls and car B only up calls, which circuit extends from the contact members $a$ of the relay 84 through conductor 138, junction point 139, conductor 140, junction point 141, conductor 142, contact members $a$ of the gate and door relay 36, conductor 143, junction point 144, conductor 145, normally closed contact members $w$ of the up-direction preference relay 71, conductor 146, contact members $a$ of the top floor landing relay 147, conductor 148, junction point 149, conductor 150, contact members $c$ of the first floor relay 41, conductor 151, the actuating coil of the relay 102 and conductor 152 to the control-circuit conductor 99. The relay 147 is energized when the car A is parked at the top-floor terminal because normally open contact members 153 of the floor selector are closed.

The closing of the contact members $a$ on the lower terminal relay 102 energizes a down transfer conductor 155 so that any calls registered on the down corridor push buttons 61, 62 and 63 will be transferred to the car A floor relays 41, 42 and 43 by the corridor relays 57, 58 and 59 to cause car A to make the corresponding down stops.

The opening of the contact members $f$ on the energized lower terminal relay 102 deenergizes the down-direction transfer conductor B155 of car B and thereby prevents the down corridor relays from energizing the down floor relays of car B. Therefore, car B will not respond to any down corridor calls that may be registered from the corridors of the several floors when it is moving from the lower terminal to the upper terminal.

The closing of the contact members $b$ on the lower terminal relay 102 automatically completes an energizing circuit for the floor relay B39 to cause car B to move from the bottom terminal to the top terminal, which circuit extends from the control circuit conductor 87, through a conductor 156, the contact members $b$ of the relay B84, conductors B138, B140 and B142, contact members $a$ of the gate relay B36, conductor B143, junction B144, conductor B157, normally closed contact members $w$ of the down-direction preference relay B72, conductor B158, contact members $a$ of the down floor terminal relay B159, (which relay is energized when lower terminal landing contact members B160 of the floor selector B64 are closed,) conductors B161 and B163, normally closed contact members $f$ of the relay 171 of car A, conductor B165, junction point B166, the up-direction corridor relay transfer conductor B167, conductor B168, contact members $b$ of the relay 102 of car A, conductors B169, B367 and B174, contact members B67 of the floor selector B64, conductor B175, the actuating coil of the relay B39 and conductor B176, to the control-circuit conductor B99 which is energized.

The closing of the contact members $b$ on the energized up floor relay B39 completes a holding circuit for that relay extending from conductor B92, through conductor B172, contact members $b$ of the relay B39, conductors B173 and B174, contact members B67 of the floor selector, conductor B175, the actuating coil of the relay B39 and conductor B176, to the energized conductor B99. The relay B39 will now stay energized until the contact members B67 on the floor selector B64 are opened when the car B passes the slow down zone for the top terminal floor.

The closing of the contact members $b$ on the up floor relay B39 also energizes one of the contact members B75 on the floor selector B64 so that, when the car B enters the slow down zone for the top floor and thereby causes the brush B35$a$ to close the contact members 76 on the floor selector B64, a circuit will be completed for energizing the down preference relay B72 to stop the car at the top floor.

The closing of the contact members $a$ on the energized up floor relay B39 completes a circuit for energizing the up call relay B121, which circuit extends from the conductor B174, through conductor B177, the contact members $a$ of relay B39, up floor-relay conductor B178, conductor 186, normally closed contact members $h$ of the down call relay B101, conductor B187, the actuating coil of the up call relay B121, conductor B188, normally closed contact members $h$ of the relay B32 and conductors B119 and B120, to the energized conductor B99.

The opening of the contact members $h$ on the up call relay B121 prevents the down call relay B101 from being energized while any up floor relays for car B are energized. Therefore, inasmuch as the floor relay B39 for the top floor is energized, the car B will make a complete trip to the top floor if it starts in that direction.

The closing of the contact members $a$ on the up call relay B121 does not, in this case, energize relay B39 because that relay is already energized.

The closing of the contact members $c$ of the floor relay B39 completes a circuit for energizing the top-floor terminal relay B171 to cause car B to answer all up calls, which circuit extends from the junction point B144 (that is energized when the gate and door are closed) through conductor B157, normally closed contact members $w$ of the relay B72, conductor B158, contact members $a$ of the relay B159, conductor B161, junction point B162, conductor B191, contact members $c$ of the floor relay B39, conductor B192, the actuating coil of the relay B171 and conductor B193, to the energized conductor B99.

The opening of the contact members $f$ on the terminal relay B171 deenergizes the up transfer conductor 167 and prevents the car A from receiving up corridor calls while it is going down.

The closing of the contact members $a$ on the terminal relay B171 energizes the up transfer conductor B167 to cause the car B to answer all up corridor calls as it makes its up trip.

As previously described, the opening of the contact members $f$ and the closing of the contact members $a$ on the relay 102 deenergized the down transfer conductor for car B and energized the down transfer conductor for car A. Therefore, when the car B is parked at the lower terminal landing and the car A at the upper terminal landing with their gates and doors closed, all up calls will be answered by the car B and all down calls will be answered by car A.

The closing of the contact members $a$ on the floor relay B39 also completes an energizing circuit for the up-direction control relay B33 to cause the car B to move upwardly, which circuit extends from the conductor B174, through conductor B177, the contact members $a$ of relay B39, conductors B178 and B179, normally closed contact members $g$ of the relay B32, conductor B180, normally closed contact members $x$ of the up-direction preference relay B71, conductor B181, normally closed contact members $y$ of the relay B72, conductor B182, the actuating coil of the up control relay B33, conductor B183, normally closed contact members $g$ of the down control relay B34, conductor B184, normally closed contact members $f$ of the down direction relay B32 and conductor B185, to the conductor B99.

The closing of the contact members $a$ on the up-direction control relay B33 completes an energizing circuit for the high-speed relay BHS for causing the resistor B20 to be short-circuited so that generator BG will develop full voltage when the up-direction switch B11 is closed.

The closing of the contact members $c$ on the control relay B33 completes a circuit for energizing the up-direction relay B31 which circuit extends from the car push-button control-circuit conductor B92, through conductor B194, the contact member $c$ of the relay B33, conductors B195 and B196, the actuating coil of the up direction relay B31, the contact members $b$ of the gate relay B36, conductors B197 and B184, the normally closed contact members $f$ of the down-direction relay B32 and conductor B185, to the control circuit conductor B99.

The closing of the contact members $c$ on the up-direction relay B31 completes a self-holding circuit for that relay, which circuit extends from conductor B92, through conductor B134, the contact members $b$ of the inductor landing relay B79, conductor B135, the contact members $c$ of the up-direction relay B31 and conductor B200, to the conductor B195. Therefore, when the up-direction high-speed relay B33 is deenergized to initiate slow-down of the car as it approaches a floor, the relay B31 will remain energized until the inductor landing relay B79 operates to open its contact members b and stop the car.

The closing of the contact members a on the up-direction relay B31 completes a circuit for energizing the up-direction switch B11 and the actuating coil of the brake-releasing relay B133, which circuit extends from the control-circuit conductor B13, through conductors B201 and B202, contact members a of the up-direction relay B31, conductor B203, the actuating coil of the up-direction switch B11, conductors B204 and B205, the coil of the relay B133 and conductor B206, to the control-circuit conductor B14.

The energization of the up-direction switch B11 causes the motor BG to drive the car upwardly, as previously described.

The car A is now moving towards the first-floor landing at high speed, and the car B is moving towards the top-floor landing at high speed.

Assuming that, at the moment, the cars A and B have started toward their respective terminal landings or shortly thereafter, a waiting passenger registers a down call from the corridor of the third floor, then the down-direction relay 43 of car A will be energized to stop car A at the third floor.

The pressing of the down push button 63 at the third-floor corridor completes a circuit for energizing the down corridor relay 59, which circuit extends from the control-circuit conductor 87, through conductor 207, the contact members of the push-button switch 63, the conductor 208, the actuating coil of the third-floor corridor relay 59, conductor 209, the normally closed contact members f of the down floor relay 43, conductor 210, the normally closed contact members f of the down floor relay B43 and conductors 211 and 348, to the control-circuit conductor B99.

The closing of the contact members a on the corridor relay 59 completes a self-holding circuit for that relay extending from the control-circuit conductor 87, through conductor 212, contact members e of the relay 84 of car A, conductor 213, the contact members a of the relay B84, conductor 214, junction point 215, conductors 216 and 217 and the contact members a of the down corridor relay 59, to the conductor 208.

The closing of the contact members b on the corridor relay 59 completes a circuit for energizing the floor relay 43 for car A, which circuit extends from the junction point 334 of the transfer conductor 155 (which is energized, because the contact members a of the relay 102 are closed), through conductor 218, the contact members b of the corridor relay 59, conductors 219 and 220, the contact members 70 of the floor selector 64, conductor 221, the coil of the floor-relay 43 and conductor 222, to the control-circuit conductor 99.

It is to be noted that the corridor relay 59 is also provided with contact members c for closing a circuit through the transfer conductor B155 for energizing the third-floor down relay B43. But, since the down transfer conductor B155 is deenergized, no circuit can be completed now for energizing the down floor relays of car B.

The floor relay 43, of car A, upon being energized, closes its contact members b to complete a self-holding circuit for itself that extends from the car-button-control-circuit conductor 92, through conductor 223, the contact members b of the floor relay 43 and conductor 224, to the conductor 219.

The opening of the contact members f on the downfloor relay 43 deenergizes and restores the down corridor relay 59.

Also, upon the closure of the floor relay 43, a circuit is established for the down-direction-floor-relay-circuit conductor 108 that extends from the conductor 220, through conductor 225, the contact members a of the relay 43 and conductor 226, to the floor-relay circuit conductor 108. It is to be noted that the conductor 108 is energized when any one of the down floor relays for car A is energized, for the purpose of preparing circuits to be completed later in the operation of the down preference relay 72.

The closing of the contact members b on the down floor relay 43 also energizes one of the contact members 76 on the floor selector 64 so that, when the car A enters the slow-down zone for the third floor and thereby causes the brush 35 to close the contact members 76 on the floor selector, a circuit will be completed for energizing the down preference relay 72 to stop the car at the third floor.

As the car A enters the slow-down zone for the third floor, the brush 35 on the floor selector engages and closes the floor-selector contact members 76, thereby completing a circuit for energizing the down-direction preference relay 72 to cause the car to slow down and stop, which circuit extends from the energized conductor 221, through conductor 227, normally open contact members 76 of the floor selector 64, conductor 228, conductor 229, contact members k of the down high-speed relay 34, conductor 230, junction point 231, conductor 232, the actuating coil of the relay 72, conductor 233, conductor 113, normally closed contact member g of the up control relay 33, conductor 114, normally closed contact members f of the up-direction relay 31 and conductor 115, to the energized conductor 99.

The closing of the contact members a on the down-direction preference relay 72 completes a self-holding circuit for that relay which extends from the energized junction point 129, through conductor 234, contact members b of the down-direction relay 32, conductors 235 and 236, contact members a of the direction-preference relay 72 and conductors 237 and 238, to the junction point 231 and thence, through the coil of the relay 72, conductors 233 and 113, the normally closed contact members g on relay 33, conductor 114, the normally closed contact members f on relay 31 and conductor 115, to the energized conductor 99.

The opening of the contact members x on the preference relay 72 deenergizes the down control relay 34.

The opening of the contact members a on the down control relay 34 deenergizes the high-speed relay HS, thereby causing the resistor 20 to be reconnected in series-circuit relation with the generator field winding 9. Consequently, the voltage developed by the generator AG will be reduced to thereby cause the hoisting motor M to decelerate to low speed.

The closing of the contact members e on the down-direction preference relay 72 completes a circuit for energizing the inductor landing relay 79 so that it will be actuated to stop the car when it decelerates to the third-floor level, which circuit extends from the energized conductor 13, through conductor 239, the coil of the relay 79, conductor 240, contact members $b$ of the brake relay 133, conductors 241 and 242, contact members $e$ of the preference relay 72 and conductors 243 and 244, to the energized conductor 14.

When the car A slows down and reaches a point approximately on a level with the third floor, the energized inductor-landing relay 79 is brought adjacent to an inductor plate 245, located in the hatchway at the third floor, which operates the landing relay 79 to open its normally closed contact members $b$, thereby deenergizing the down-direction relay 32.

The opening of the contact members $a$ on the deenergized down-direction relay 32 deenergizes the down-direction switch 12 and the brake-release relay 133. The deenergization of the switch 12 and the relay 133 causes the motor M to be disconnected from the generator AG, and the brake release coil 29 to be deenergized to permit the brake 32 to be applied to the drum 33, thereby bringing the car to a positive stop level with the third floor.

As previously described, upon the opening of the down-direction switch 12, the demagnetizing field winding 10 is connected across the armature of the generator G to reduce the residual magnetism of the generator field poles to approximately zero value in order to prevent the motor from pulling the car through the brake.

The opening of the contact members $b$ on the deenergized down-direction relay 32 opens the self-holding circuit of the down preference relay 72 and deenergizes that relay so that the car may restart after it has stopped.

The car A is now stopped level with the third floor and will remain there for a predetermined period of time to permit passengers in the corridor to open the door and gate and enter the car. If the passengers do not open the door and gate, the car will, at the end of the predetermined time, resume its trip to the lower terminal.

Delay for a predetermined time is secured by adding a dash pot to the shaft upon which the contact members $x$, $y$ and $z$ of the relay 72 are mounted. The dash pot causes the contact members $z$ to open slowly and the contact members $x$ and $y$ to close slowly in succession when the relay 72 is deenergized.

The contact members $z$ of the relay 72, when closed, complete one gap in an auxiliary circuit for re-energizing the relay 72, the other gap of which may be closed by the closure of the contact members $g$ on the gate and door relay 36 when that relay is deenergized by someone opening the door or gate of the car. Therefore, because the contact members $z$ of relay 72 are slow to open, they give the passenger an opportunity to re-energize the preference relay 72 within a predetermined time after the car stops by opening the door or gate and thereby closing the second gap in the circuit before the first gap is broken. When both of the gaps in the auxiliary circuit are closed, the preference relay 72 is re-energized, and the car will be held at the floor until the relay 72 is again deenergized.

With the relay 72 re-energized, the car cannot re-start because the control relay 34 cannot be re-energized so long as the contact members $x$ on the relay 72 are open. As noted before, the contact members $x$ are slow to close, and, therefore, they keep the car from re-starting immediately after it stops.

The contact members $y$ on the preference relay 72 are electrically interlocked with the contact members $x$ on the preference relay 71 for safety purposes and, therefore, should be set to close shortly after the contact members $x$ on relay 72 close.

While any suitable relay may be employed to perform the functions of the direction preference relays 71 and 72, I have schematically disclosed, in Fig. 11, a preference relay that will operate satisfactorily.

The direction preference relay shown in Fig. 11 is provided with contact members arranged like those on relays 71 and 72 comprising the normally open contact members $a$, $e$ and $z$ and the normally closed contact members $w$, $x$ and $y$. The contact members $a$, $e$ and $w$ are secured to a bracket B that is pivotally mounted on a pin P. An armature Ar is pivotally mounted on the bracket B and is disposed to be attracted towards a core C, upon which an actuating coil of the relay is mounted.

Each pair of contact members $x$, $y$ and $z$ comprises one movable and one stationary contact member. Each of the movable members associated with the stationary contact members $x$ and $y$ is provided with a spring $s$ that is disposed to bias it towards a closed circuit position. The movable member associated with the stationary member of the contact members $z$ is provided with a spring $s$ for biasing it towards an open-circuit position.

A plurality of cams $C_1$, $C_2$ and $C_3$ are provided for actuating the contact members $x$, $y$ and $z$. As shown, the cams are mounted on a shaft in such manner as to be displaced at an angle to each other. The relative angular displacement of the cams $C_1$ and $C_2$ is such that the contact members $x$ will open before the contact members $y$ and also close before the contact members $y$. The cam $C_3$ is so arranged that the contact members $z$ will be closed when the contact members $x$ and $y$ are opened.

When the coil of the relay is energized, the armature Ar will be attracted towards the core C, thereby closing the contact members $a$ and $e$ instantly and opening the contact members $w$ instantly. In order that the contact members $x$, $y$ and $z$ may be actuated in response to the energization of the coil C, the shaft Sh is connected to the bracket B by a lever $l$ and a link $m$. As shown, one end of the lever $l$ is fixedly secured to the shaft Sh and its middle portion is mechanically connected to the lower tail piece $t$ on the lower end of the bracket B by the link $m$. The upper end of the link $m$ passes loosely through a hole in the tail piece $t$ and is provided with a head $h$ that impinges against the upper side of the tail piece $t$ so that the link will be moved upwardly when the bracket B is actuated by energization of the coil C. A spring $S^1$ is secured to the free end of the link $m$ to bias the shaft Sh to turn in a clockwise direction. A dash pot is mounted on the lower end of the link $m$ to retard the downward movement of the link after it has been released by the bracket B and is being moved under the force exerted by the spring $S^1$.

Therefore, if the relay is energized, the inward movement of the bracket B will close the contact members $a$ and $e$ instantly and open the contact members $w$ instantly. The inward movement of the bracket B will also raise the link m, thereby lifting the lever l and rotating the shaft Sh in a counter-clockwise direction to open the contact members x and y in succession and close the contact members z.

If the relay is deenergized, the bracket B will move outwardly, thereby opening the contact members a and c instantly and closing the contact members w instantly. The outward movement of the bracket B also permits the link m and the lever l to return to their lowermost position under the force exerted by the spring $S^1$, thereby rotating the shaft Sh in a clockwise direction to close the contact members x and y in succession and open the contact members z. However, the dash pot on the lower end of the link m delays the downward movement of the link m and the lever l when the bracket B moves out and, therefore, the closing of the contact members x and z in succession and the opening of the contact members z upon deenergization of the relay will be delayed for a predetermined time in accordance with the setting of the dash pot.

When the car A passes the third-floor slow-down zone, the floor-selector pin 35b opens the contact members 70 and closes the contact members 252'. The opening of the contact members 70 deenergizes and restores the down floor relay 43. The closing of the contact members 252' partially prepares a circuit that may be used when only one car is operating and which will be described later.

Assuming that a passenger standing in the third-floor corridor when the car stops at that landing, opens the gate and door before the expiration of the predetermined time necessary for the contact members z on the preference relay 72 to open, then the opening of the door and gate will deenergize the door and gate relay 36 to close its contact members g and thereby complete a circuit for reenergizing the preference relay 72 so that the car will be held at the third floor until the door and gate are re-closed, which circuit extends from the car-push-button circuit conductor 92, through conductor 246, normally closed contact members g of the gate relay 36, conductor 247, normally closed contact members $f^1$ of the first-floor terminal relay 159, conductors 248 and 249, normally open time-element contact members z of the direction preference relay 72 and conductors 250 and 238, to the junction point 231. From junction point 231, the circuit may be traced through the coil of the relay 72 to the conductor 99, in the same manner as it has been traced previously herein.

Assuming further that a waiting passenger enters the car A and closes the gate and door, then the door and gate relay 36 will be energized, as previously described, to open its contact members g and thereby deenergize the down-direction preference relay 72. In response to the deenergization of the relay 72, its time-element contact members x are closed to re-establish the energizing circuit for the down control relay 34, which circuit may be traced from the conductor 108, through conductor 109, etc., to the conductor 99, as previously described.

Upon the closure of the down control relay 34, the previously traced energizing circuits for the down-direction relay 32, the down-direction switch 12 and the brake release coil 29 are re-established, and the car will continue on its way to the first-floor landing.

Assuming now that a passenger, who entered the car A at the third floor, desires to stop the car at the second floor, then he presses the second-floor down car push-button 48 to cause the car to stop at the second floor. The operation of the car push-button 48 completes a circuit for energizing the down floor relay 42 of car A that extends from the car-button-control-circuit conductor 92, through conductor 253, the contact members of the down car push-button 48, conductors 254 and 255, the contact members 69 on the floor selector 64, conductor 256, the actuating coil of the down floor relay 42 for the second floor and conductor 257, to the control circuit conductor 99.

The closing of the contact members b on the energized down floor relay 42 completes a holding circuit for that relay extending from the conductor 92, through conductor 258, the contact members b of the relay 42 and conductor 259, to the conductor 254.

The closing of the contact members b on the energized down floor relay 42 also energizes one of the contact members 77 on the floor selector 64 so that, when the car A enters the slow-down zone for the third floor and thereby causes the brush 35 to close the contact members 76, a circuit will be completed for energizing the down preference relay 72 to stop the car at the third floor.

The closing of the contact members a on the floor relay 42 completes a circuit for energizing the conductor 108 to permit the preference relay 72 to be energized, which circuit extends from conductor 255, through conductor 260, the contact members a of relay 42 and conductor 261, to conductor 108.

When the car enters the slow-down zone for the second floor, it causes the brush 35 on the floor selector 64 to close the contact members 64, thereby completing a momentary circuit for the down-direction preference relay 72, which circuit extends from the conductor 256, through conductor 262, the contact members 77 of the floor selector and conductor 263, to the conductor 229. From conductor 229, the circuit is the same as that traced when the momentary circuit was established in response to the closure of the contact members 76 of the floor selector when the car entered the slow-down zone for the third floor.

When the relay 72 is momentarily energized, it closes, thereby re-establishing its own holding circuit and interrupting the energizing circuit for the down control relay 34. Also, when the relay 72 is closed, the energizing circuit of the inductor landing relay 79 is re-established. The car will now operate at low speed until an inductor plate 264, located in the hatchway at the second floor, causes the normally closed contact members b of the inductor landing relay 79 to open, whereby the down-direction relay 32 is deenergized.

It is to be noted that, as the car A passes the slow-down zone of the second floor, the contact members 69 and 252 of the floor selector are opened and closed, respectively. In response to the opening of the contact members 69 of the floor selector, the second-floor down relay 42 is deenergized. (The closing of the contact members 252 partially prepares certain circuits that are utilized only in single-car operation and are not included in the present operation.)

Upon the deenergization of the down-direction relay 32, the down-direction switch 12 opens to disconnect the motor M from the generator AG and to effect deenergization of the brake-release coil 29. The car A is now stopped level with the second floor.

When the down-direction relay 32 opens, the down-direction preference relay 72 is deenergized, but its contact members $x$ and $y$ will not close until a definite length of time has passed. Likewise, the contact members $z$ of the relay will not open until a given period of time has elapsed. Therefore, the car will pause at the second floor for a predetermined period to permit the door and gate to be opened.

Assuming that the gate or door is not opened when the car A stops at the second floor, then the down-direction preference relay 72 will remain deenergized. Therefore, the contact members $x$ of this relay will close at the end of the time interval afforded by the dash pot 251. Accordingly, the down control relay 34 will be re-energized and close. In response to the closure of the down control relay 34, the down-direction relay 32, the down-direction switch 12 and the brake relay 133 will close, whereupon the car A will continue on its way to the lower terminal.

When the car A enters the slow-down zone of the lower terminal, the normally open contact members 78 on the floor selector 64 are momentarily closed by the brush 35 to momentarily energize the down preference relay 72. The momentary energizing circuit extends from the conductor 97 through conductor 266, the contact members 78 of the floor selector, conductor 267 and the conductor 229, etc., to conductor 99. In response to the energization of the relay preference 72, the control relay 34 is deenergized, as previously described, to cause operation of the motor at low speed until the car arrives on a level with the lower terminal.

At the time the preference relay 72 is energized, the closing of its contact members $e$ energizes the inductor relay 79. As the car arrives on a level with the lower terminal, an inductor plate 268 operates the energized inductor-landing relay 79 to open its contact members. The opening of the contact members on the relay 79 interrupts the self-holding circuit for the down-direction relay 32 which, in turn, causes deenergization of the down-direction switch 12 and the brake relay 133, thereby stopping the car level with the lower-terminal floor.

Also, when the car arrives at the slow-down zone of the first floor, the floor-selector contact members 160 are closed by the brush 35a, whereby an energizing circuit for the lower-terminal-landing relay 159 is completed.

From the above description of the operation of the car A, it will be seen that, if one or more of its down floor relays are energized when the car is moving in the down direction, the car will stop at the several floors from which calls may be registered. If the gate and door are opened to admit passengers or to allow them to leave, the car will stay at that floor until the gate and the door are closed. Upon closure of the gate and door, the car will continue on its way to the lower-terminal landing, at the end of a given time interval, stopping in the meantime at each floor from which a down call is registered, provided the call is registered before the car has passed the slow-down zone for that floor.

While the car A is moving from the upper terminal, the car B is moving from its lower terminal towards the second floor. Assuming that a passenger, who entered the car B at the first floor, desiring to get off the car at the second floor, presses up car push-button B44, corresponding to the second floor, then a circuit will be completed for energizing the up floor relay B37 to cause the car B to make a stop at the second floor, which circuit extends from the car-button-control-circuit conductor B92, through conductor B269, the contact members of the car push-button B44, conductors B270, B271 and B272, the contact members B65 of the floor selector 64, conductor B273, the coil of relay B37 and conductor B274, to the control-circuit conductor B99.

Upon energization of the up floor relay B37, it closes its contact members $b$ to complete a self-holding circuit for itself, extending from the conductor B92, through conductor B275, the contact members $b$ of the relay B37 and conductor B276, to conductor B272.

Closing the contact members $b$ on the up floor relay B37 also energizes one of the contact members B73 on the floor selector B64 so that closure of the contact members B73 by the car entering the slow-down zone for the third floor will energize the up preference relay B71 to cause the car to stop at the third floor.

The closing of the contact members $a$ on the energized floor relay B37 completes a circuit for energizing the up-direction-floor-relay conductor B178 to energize the up-call relay B121, which circuit extends from conductor B272, through conductor B277, the contact members $a$ of floor relay B37 and conductors B278, to the conductor B178. However, the up-call relay B121 has been energized by the floor relay B39 and, therefore, no new result is now obtained. The energization of the conductor B178 by the relay B38 is explained to show how the up-call relay B121 will be energized to cause car B to make a trip to the upper terminal when any up floor relay of car B is energized and both cars are in service.

When the car B enters the slow-down zone for the second floor, the normally open contact members B73 of the floor selector B64 are momentarily closed by the brush B35a to complete a circuit for momentarily energizing the up-direction preference relay B71, which circuit extends from the conductor B92, through the contact members $b$ of relay B37 and the contact members B65 on the floor selector B64, to conductor B273, as previously described, and thence, through conductor B279, the contact members B73 on the floor selector B64, conductors B280 and B281, the contact members $k$ of control relay B33, conductor B282, junction B283, the coil of relay B71, conductors B285 and B183, the contact members $g$ of control relay B34, conductor B184, the contact members of relay B32 and conductor B185, to conductor B99.

The closing of the contact members $a$ on the energized relay B71 completes a self-holding circuit for itself that extends from the conductor B195, through contact members $b$ of the up-direction relay B31, conductors B286 and B287, contact members $a$ of the up-direction preference relay B71 and conductors B288 and B289, to the junction point B283. The remainder of the circuit extends from the junction point B283 to the conductor B99 in the same manner as the momentary circuit described above.

The opening of the contact members $x$ on the up-direction preference relay 71 deenergizes the control relay B33 to decelerate the car to slow speed.

The opening of the contact members $a$ on the deenergized control relay B33 deenergizes the high-speed relay BHS to re-insert the resistor B20 in the circuit of the generator field B9, whereby the speed of the hoisting motor BM is reduced, and the car decelerates to low speed.

The closing of the contact members e on the preference relay B71 completes a circuit for energizing the inductor-landing relay B79 to stop the car B when it arrives at the second floor, which circuit extends from supply conductor B13, through conductor B239, the coil of relay B79, conductor 240, the contact members b of brake relay B133, conductors B241 and B242, the contact members e of relay B71 and conductor B244, to supply conductor B14.

When the car B arrives on a level with the second floor, the inductor plate B264 operates the inductor landing relay B79 to open its contact members, thereby deenergizing the up-direction relay B31.

The opening of the contact members a on the deenergized up-direction relay B31, deenergizes the up-direction switch B11 and the brake relay B133. The deenergization of the up-direction switch B11 and the relay B133 disconnects the motor BM from the generator BG, and deenergizes the release coil 29 to apply the brake 27. The car B then stops level with the second floor.

Also, when the car B moves up to the second floor, the contact members B65 on the floor selector B64 are opened by the pin B35C to deenergize the floor relay B37 and, as the car leaves, the contact members B299 are closed to partially prepare a circuit from the conductor B92, to the down-direction-floor-relay-circuit conductor B103. The relay B37 is now in condition to be energized when the up corridor relay 51 is closed, provided the car A is held at one of the floors by reason of its gate or door being held open, or, if car B is later selected, to answer the second floor up call when certain conditions prevail which will be subsequently described herein.

It is to be noted also that, when the up-direction relay B31 is deenergized, the opening of its contact members b deenergizes the up-direction preference relay B71. However, the control relay B33 will not be reenergized by the deenergization of the relay B71 to start the car until the time-element contact members x of the relay B71 have closed. If the contact members x close before the gate and door have been opened, the car B will re-start and continue on its up trip.

Assuming that a passenger in the car B opens the gate and door and leaves the car, then the car will be held at the second floor until the gate and door are re-closed. The opening of the gate and door interrupts the circuit for the door-and-gate relay B36. The deenergization of the relay B36 closes its contact members g for completing a circuit to reenergize the preference relay B71, which circuit extends from conductor B92, through conductor B246, contact members g of relay B36, conductor B247, normally closed contact members f' of the relay B159, conductor B291, time-element contact members z of the up-direction preference relay B71 and conductors B292 and B289, to the junction point B283, from which point the circuit continues to the conductor B99, in the same manner as described previously herein.

Assuming that a departing passenger closes the gate and door of the car B, then the gate relay B36 will be reenergized, thereby causing the control relay B33 to be reenergized for restarting the car on its upward trip.

Assuming now that a waiting passenger at the third-floor corridor presses the up corridor push button 55 to cause the next up car to stop at that floor, then a circuit is completed for the third floor up corridor relay 52 that extends from the control circuit conductor 87, through conductors 294, 295 and 296, the contact members of the push button 55, conductor 297, the coil of the relay 52, conductor 298, normally closed contact members f of the relay 38, conductor 299, normally closed contact members f of the floor relay B38 and conductors 300, 301 and 302, to the energized conductor B99.

The closing of the contact members a on the energized up corridor relay 52 completes a self-holding circuit for that relay which extends from the conductor 87, through conductor 303, the contact members b of a relay 304, conductor 305, contact members c of the relay B84, conductors 306 and 307, conductor 308, the contact members a of the relay 52 and conductor 309, to the conductor 297 and thence, through conductor 297, to conductor B99, as previously described.

The closing of the contact members e on the energized up corridor relay 52 completes a circuit for energizing the up floor relay B38 of car B, which circuit extends from the junction point B139 on the control circuit conductor B138, through conductor B140, to the junction point B141, through conductor B310, contact members a of the up relay B171, conductor B311 and B312 to junction point B166, through the transfer conductor B167 for the corridor up, corridor relays, conductor B313, the contact members c of the relay 52, conductor B314 and B135, contact members B66 of the floor selector 64, conductor B316, the actuating coil of the relay B38 and conductor B317, to the control-circuit conductor B99.

The up floor relay B38, upon being energized, closes its contact members b to complete a self-holding circuit for itself that extends from the conductor B92, through conductor B318, contact members b of the relay B38 and conductor B319, to the conductor B315.

The closing of the contact members b on the up floor relay B38 also energizes one of the contact members B74 on the floor selector B64 so that, when the car B enters the slow-down zone for the third floor and thereby causes the brush B35a to close the contact members B74, a circuit will be completed for energizing the up preference relay 71 to stop the car at the third floor.

The opening of the contact members f on the energized floor relay B38 deenergizes and restores the corridor relay 52 to its normal condition.

The closing of the contact members a on the energized floor relay B38 completes a circuit for energizing the up-direction-floor-relay conductor B178 to cause the up call relay B121 to be energized as previously described, which circuit extends from conductor B315, through conductor B321, the contact members a of relay B38 and conductor B322, to conductor B178.

As the car B enters the slow-down zone of the third floor, it causes the floor-selector brush B35 to engage and close the contact members B74 to complete a momentary circuit for energizing the up-direction preference relay B71, which circuit extends from the conductor B316 (energized by the closing of contact members b on relay B38), through conductor B323, contact members B74 of the floor selector B64, conductor B324 and B281, the contact members k of relay B33, junction B283, the coil of relay B71, conductors B285 and B183, the contact members g of relay B34, conductor B184, the contact members *f* of relay B32 and conductor B185, to supply conductor B99.

When the relay B71 is energized, the control relay B33 and the high-speed relay BHS are deenergized, whereupon the voltage of the generator BG is reduced to cause the motor BM to operate the car at low speed. The energization of the relay B71 also causes the inductor landing relay B79 to be energized as previously described. Therefore, when the car B reaches the level of the third floor at low speed, the inductor plate B245 operates the inductor landing relay B79 to stop the car exactly level with the floor, as previously described.

Also, when the car B passes the slow-down zone for the third floor, it causes the floor selector pin B35c to open the contact members B66 and close the contact members B290'. Upon the opening of the contact members B66, the circuit for the up floor relay B38 is interrupted and it is thereby restored to its open position.

The closing of the contact members B290' on the floor selector partially completes a circuit for the down-direction floor relay conductor B108, whereby it may be energized in response to the closure of any one of the down corridor relays provided car A is rendered inoperative by reason of its gate or door being held open.

Assuming now that the passenger at the third floor opens the door and gate, enters the car and closes the gate and door, then the contact members *x* on the preference relay B71 will close to reenergize in turn, the up-direction control relay B33, the up-direction relay B31, the up-direction switch B11, and the brake relay B133 and the car will re-start on its trip to the upper terminal.

It will be recalled that the floor relay B39 for car B was energized by the lower terminal relay 102 of car A to call the car B to, and stop it at, the upper terminal. Therefore, as car B enters the slow-down zone for the upper terminal, the contact members B75 on the floor selector are momentarily closed by the brush B35a, thereby completing a circuit for energizing the up-direction preference relay 71, to slow down the car and stop it at the upper terminal, which circuit extends from conductor B175, through conductor B326, the contact members B76 on the floor selector B64 and conductor B327, to conductor B281 and thence to the conductor B99 by way of the conductors and contact members previously described.

The car B will now operate at low speed, and, when it arrives on a level with the upper terminal floor, the inductor landing relay B79 (which is energized in response to the closure of the preference relay B71), being adjacent to an inductor plate B328, operates to open its normally closed contact members *b* and thereby interrupt the circuit of the up-direction relay B31.

The up-direction relay B31, being deenergized, the up-direction switch B11 and the brake relay B133 drop open. The motor BM is thereby disconnected from the generator BG, the brake 27 is applied and the car stops at the upper terminal.

Also, when the car B arrives at the slow-down zone for the upper terminal, the floor selector contact members B67 are opened by the pin B35c to deenergize the up-direction floor relay B39.

It is to be noted that, when the car B is parked at the upper terminal landing, each of the contact members B290, B290', B70, B69 and B68 on the floor selector B64 are closed and each of the contact members B252, B252', B65, B66 and B67 are open; therefore, no registered up floor calls can be transmitted to the car B while it is at the top-floor landing, except under certain conditions of operation that will be described later.

Likewise, when the car A is at the lower terminal landing, each of the contact members 252, 252', 65, 66 and 67 of the floor selector 64 are closed, and each of the contact members 69, 70, 290 and 290' are open. Therefore, no registered down floor calls can be transmitted to the car A while it is parked at the lower-floor terminal except under certain conditions of operation that will be described later.

*Car B parked at top terminal landing—gate or door open, car A parked at lower terminal landing—gate and door closed*

Assuming that the car A is now parked at the lower floor terminal, with its gate and door closed, and the car B is parked at the upper floor terminal, with its gate or door open, and that a waiting passenger at the second-floor corridor presses the down corridor push button 62 to bring a car to him for a downward trip, then the down-direction corridor relay 58 will be energized to cause the car A to leave its lower terminal, go to the top terminal and then return to its lower terminal so that it may stop at the second floor corridor for the waiting passenger on its down trip. Meanwhile, the car B remains at the top floor because its gate or door is open.

The pressing of the down corridor push button 62 completes a circuit for energizing the down corridor relay 58 extending from conductor 87, through conductors 207, 341 and 342, the push button 62, conductor 343, the coil of the relay 58, conductor 344, normally closed contact members *f* of the down floor relay 42, conductor 345, normally closed contact members *f* of the down floor relay B42, and conductors 346, 347 and 348, to conductor B99.

The closing of the contact members *a* on the energized corridor relay 58 completes a self-holding circuit for that relay extending from the energized conductor 216, through conductor 349, the contact members *a* of the relay 58 and conductor 350, to the coil of the relay 58 and thence to conductor B99, as previously described.

The closing of the contact members *c* on the corridor relay 58 will not energize the down floor relay B42 of car B because the transfer conductor B155 of car B is deenergized by reason of the contact members *a* on the gate relay B36 being open.

On the other hand, the closing of the contact members *b* of the relay 58 cannot, at present, energize the down floor relay 42 of car A because of the present open position of the contact members 69 on the floor selector 64.

The closing of the contact members *b* on the corridor relay 58 does, however, (by reason of the closed position of the contact members 252 on the floor selector 64) complete a circuit for energizing the up floor relay circuit conductor 178 and, through it, the up call relay 121 to cause the car A to move to the top floor so that it can make a down trip and then answer the existing down call at the second floor, which circuit extends from the junction point 139 on conductor 138, through conductor 140, junction point 141, conductor 142, contact members *a* of the gate relay 36 (the door and gate of car A being closed) conductor 143, to junction point 144, through conductor 145, normally closed contact members w of the up preference relay 71, conductors 146 and 330, contact members c of the first floor terminal relay 159, conductor 331, junction 149, conductor 332, normally closed contact members f of the relay B102, conductor 333, junction 51, conductors 155 and 336, contact members b of the corridor relay 58, conductors 337 and 255, contact members 252 of the floor selector, conductors 338, 178 and 186, normally closed contact members h of the down call relay 101, conductor 187, the actuating coil of the up relay 121, conductor 188, the normally closed contact members h of the relay 32 and conductors 119 and 120, to the control circuit conductor 99.

The opening of the contact members h on the energized up call relay 121 prevents the down call relay 101 from being energized while the car A is making its up trip.

The closing of the contact members a on the energized up call relay 121 completes a circuit for energizing the up floor relay 39 of car A corresponding to the top floor for calling that car to the upper terminal, which circuit extends from the control circuit conductor 138, through conductors 140 and 142, contact members a of the gate relay 36, conductor 157, contact members w of the relay 72, conductor 158, contact members a of the relay 159, conductor 161, conductors 191 and 352, contact members a on relay B304, conductors 353 and 354, contact members a of the relay 121, conductor 355, contact members h of the relay 39, conductors 366, 367 and 174, contact members 67, conductor 175, the coil of the floor relay 39 and conductor 176, to conductor 99.

The closing of the contact members b on the floor relay 39 completes a self-holding circuit for that relay extending from conductor 92, through conductor 172, contact members b of relay 39, conductors 173 and 174, contact members 67 of the floor selector 64, conductor 175 and the coil of relay 39, conductor 176, to conductor 99.

The closing of the contact members c on the energized up floor relay 39 completes a circuit for energizing the upper terminal relay 171 for causing the car A to answer all up calls on its way up to the upper terminal, which circuit extends from junction point 139 on conductor 138 through the contact members a of gate relay 36, the contact members w of down preference relay 72, the contact members a of relay 159, junction 162, conductor 191, the contact members c of relay 39 and the coil of relay 171, to the conductor 99.

The closing of the contact members a on the upper terminal relay 171 energized the up transfer conductor 167 to make car A answer all up corridor calls on its up trip. Therefore, if up-direction calls are registered from the corridors of the second and third floors by closing the corridor push buttons 54 and 55, circuits will be completed for the up-direction floor relays 37 and 38 of car A and it will stop for the up passengers at the second and third floors on its trip to the upper terminal.

The closing of the contact members a on the floor relay 39 also completes an energizing circuit for the up-direction control relay 33 to cause the car A to move upwardly, which circuit extends from conductor 174, through conductor 177, the contact members a of relay 39, conductors 178 and 179, normally closed contact members g of the relay 32, conductor 180, normally-closed contact members x of the up direction preference relay 71, conductor 181, normally-closed contact members y of the relay 72, conductor 182, the actuating coil of relay 33, conductor 183, the normally closed contact members g of relay 34 conductor 184, normally-closed contact members f of the down-direction relay 32 and conductor 185, to conductor 99.

When the up control relay 33 is energized, the closing of its contact members a completes an energizing circuit for the high-speed relay HS to short circuit the resistor 20 in the field winding 9 of the generator G to cause the motor M to operate at high speed when it is connected to the generator by the up-direction switch 12. A detailed description of the circuits will be omitted because they are the same as were described in moving car B to its upper terminal except that the reference numerals do not have the prefix B attached to them.

The energization of the up control relay 33 also causes, in turn, the energization of the up-direction relay 31, the up-direction switch 12 and the brake relay 133, whereupon the car A starts upwardly and runs to its upper terminal.

As the car A moves to its upper terminal, the pin 35b on the floor selector 64 closes the contact members 68, 69 and 70.

The closing of the contact members 69 on the floor selector completes the circuit prepared by the closing of the contact members b on the corridor relay 58 for energizing the down floor relay 42 to cause car A to make a down stop at the second floor, which circuit extends from the energized conductor 255, through the contact members 69 of the floor selector, conductor 256, the coil of floor relay 42 and conductor 257, to conductor 99.

Upon being energized, the floor relay 42 closes its contact members a to complete a self-holding circuit for itself, as previously described. The floor relay 42 will now stay energized until the down call at the second floor is answered by the car A.

When car A enters the slow-down zone for the upper terminal the up preference relay 71 is energized as described in connection with car B, and the car A is brought to a stop at the upper terminal.

Upon the arrival of the car A at the upper terminal, the floor selector pin 35c opens the floor selector contact members 67, thereby deenergizing the up-floor relay 39.

The opening of the contact members a on the deenergized floor relay 39 deenergizes the up floor relay conductor 178 and, through it, the up call relay 121.

The closing of the contact members h on the deenergized up call relay 121 causes the down call relay 101 to be energized by a circuit previously described to call car A to the lower terminal, because the down floor relay conductor 108 has been energized by the energization of the down floor relay 42.

Inasmuch as car A is at the upper terminal, the contact members 153 on the floor selector 64 are closed by the brush 35, and the top landing relay 147 for car A is energized by a circuit extending from junction point 91, through conductor 368, the contact members 153 on the floor selector 64, conductor 369, the coil of relay 147 and conductor 370, to the control circuit conductor 99.

The closing of the contact members a on the relay 147 partially prepares a circuit for energizing the down floor relay 41 to call the car A down to the lower terminal.

When the contact members a on the energized relay 101 close, they complete the prepared circuit for energizing the down floor relay 41, which circuit extends from the energized junction point 144, (the gate and door of car A being closed), through conductor 145, the normally closed contact members $w$ of the relay 71, conductor 146, contact members $a$ of the relay 147, conductors 148, 150 and 371, contact members $b$ of the relay B304, conductors 372 and 373, contact members $a$ of the down call relay 101, conductor 374, normally closed contact members $h$ of the relay 41, conductors 375, 95 and 96, the contact members 68 of the floor selector, conductor 97, the actuating coil of the floor relay 41 and conductor 98, to the control circuit conductor 99.

The energization of the down floor relay 41 causes the car A to make a trip to the lower terminal, as previously described.

It may be noted here that the car A, upon arriving at the top floor, with car B standing there with its gate or door open, would have been dispatched immediately to the lower terminal, even had no down call existed at the second floor, because of the energized condition of the landing relay B147 of car B.

Inasmuch as car B is standing at the upper terminal, the contact members B153 on the floor selector B64 are closed by the brush B35 and, therefore, the top-landing relay B147 is energized by a circuit extending from the junction point B91, through conductor B368, the contact members B153 of the floor selector B64, conductor B369, the coil of relay B147 and conductor B370, to the conductor B99.

In such case, the closing of the contact members $b$ on the relay B147 will complete a circuit for energizing the down floor relay 41 to cause the car A to go to the lower terminal.

As car A on its down trip enters the slow-down zone for the second floor, the contact members 77 on the floor selector 64 are closed by the brush 35 to momentarily energize the down preference relay 72 to cause the car to make a stop at the second floor. Thereupon, the energized relay 72 operates to bring the car to rest at the second floor, as previously described.

Assuming that a waiting passenger at the second floor enters the car A and closes the gate and door, then the car will run to, and stop at, the lower terminal, as previously described.

Therefore, it will be seen that, when car B is parked at the upper terminal with its gate or door open, and car A is parked at the lower terminal, with its gate and door closed, car A will answer all up and all down calls and will then park at the lower terminal.

*Car B held at a floor intermediate the top and bottom terminals—gate and door open—car A parked at the first floor terminal—gate and door closed*

Assuming that car B is held at some intermediate floor, as, for example, the third floor, because its gate or door is held open; that the car A is parked at the first floor terminal with its gate and door closed, and that a down call is registered by a waiting passenger at the second-floor corridor closing the down corridor push button 62, then the down corridor relay 58 will be energized and establish a self-holding circuit for itself, as previously described.

Inasmuch as car B is standing at the third floor with its gate or door open, the closing of the contact members $c$ on the down corridor relay 58 will not energize the down floor relay B42 of car B for the second floor because the transfer conductor B155 is deenergized by reason of the contact members $a$ on the gate relay B36 being open. Therefore, car B will not answer the down call at the second floor.

On the other hand, the closing of the contact members $b$ of the relay 58 will not, at present, energize the down floor relay 42 of car A for the second floor, because of the open position of the contact members 69 on the floor selector 64.

The closing of the contact members $b$ on the corridor relay 58 does, however, (by reason of the closed position of the contact members 252 on the floor selector 64) complete a circuit for energizing the up floor relay circuit conductor 178 and, through it, the up call relay 121 to cause the car A to move to the top floor so that it can make a down trip and pick up the existing down call, as previously described.

The opening of the contact members $h$ on the energized up call relay 121 prevents the down call relay 101 from being energized while the car A is making its up trip.

The closing of the contact members $a$ on the energized up call relay 121 completes a circuit, as previously described, for energizing the up floor relay 39 of car A corresponding to the top floor for calling that car to the upper terminal.

The closing of the contact members $b$ on the floor relay 39 completes a self-holding circuit for that relay, as previously described.

The closing of the contact members $c$ on the energized up floor relay 39 completes a circuit for energizing the top terminal relay 171 for causing the car A to answer all up calls on its way up to the upper terminal, as previously described.

The closing of the contact members $a$ on the terminal relay 171 energizes the up transfer conductor 167 to make car A answer all up corridor calls on its up trip, as previously described. Therefore, if up direction calls are registered from the corridors of the second and third floors by closing the corridor push buttons 54 and 55, circuits will be completed for the up-direction floor relays 37 and 38 of car A and it will stop for the up passengers at the second and third floors on its trip to the upper terminal.

The closing of the contact members $a$ on the floor relay 39 also completes an energizing circuit for the up-direction control relay 33 to cause the car A to move upwardly.

When the up control relay 33 is energized, the closing of its contact members $a$ completes an energizing circuit for the high-speed relay HS to short circuit the resistor 20 in the field winding 9 of the generator G to cause the motor M to operate at high speed when it is connected to the generator by the up-direction switch 12. A detailed description of the circuits will be omitted because they are the same as were previously described.

The energization of the up control relay 33 also causes, in turn, the energization of the up-direction relay 31, the up-direction switch 12 and the brake relay 133, whereupon the car A starts upwardly and runs to its upper terminal.

As the car A moves to its upper terminal, the arm on the floor selector 64 closes the contact members 68, 69 and 70.

The closing of the contact members 69 on the floor selector completes the circuit prepared by the closing of the contact members $b$ on the corridor relay 58 as previously described for energizing the down floor relay 42 to cause car A to make a down stop at the second floor.

Upon being energized, the down floor relay 42 closes its contact members a to complete a self-holding circuit for itself, as previously described. The floor relay 42 will now stay energized until the down call at the second floor is answered by the car A.

When car A enters the slow-down zone for the upper terminal, the up preference relay 71 is energized, and the car A is brought to a stop at the upper terminal.

Upon the arrival of the car A at the upper terminal, the floor selector pin 35c opens the floor-selector contact members 67 thereby deenergizing the up-floor relay 39.

The opening of the contact members a on the deenergized floor relay 39 deenergizes the up floor relay conductor 178 and, through it, the up call relay 121.

The closing of the contact members h on the deenergized up call relay 121 causes the down call relay 101 to be energized by a circuit previously described to call car A to the lower terminal, because the down floor relay conductor 108 has been energized by the energization of the down floor relay 42.

Inasmuch as car A is at the upper terminal, the contact members 153 on the floor selector 64 are closed by the pin 35, and the top landing relay 147 for car A is energized by a circuit, as previously described.

The closing of the contact members a on the relay 147 partially prepares a circuit for energizing the down floor relay 41 to cause the car A to make a complete trip to the lower terminal.

When the contact members a on the energized relay 101 close, they complete the prepared circuit for energizing the down floor relay 41, as previously described.

The energization of the down floor relay 41 causes the car A to make a trip to the lower terminal, as previously described.

As car A on its down trip enters the slow-down zone for the second floor, the contact members 77 on the floor selector 64 are closed by the brush 35 to momentarily energize the down preference relay 72 to cause the car to make a stop at the second floor. Thereupon, the energized relay 72 operates to bring the car to rest at the second floor, as previously described.

Assuming that the waiting passenger at the second floor enters the car A and closes the gate and door, then the car will run to, and stop at, the lower terminal, as previously described, ready to answer any up calls or any further down calls.

Therefore, it will be seen that, if one car is standing at any floor with its gate and door open, the other car will answer all up and down calls.

*Cars A and B at first floor terminal—gates and doors open—door and gate of car A closed before gate and door of car B*

If both of the cars A and B are parked at the first-floor terminal, with their gates or doors open, neither car will move in response to floor calls which may be registered at the corridor floors until the gate and door of one or the other of the cars are closed. The closing of the gate and door will determine which car will start in response to the registering of one or more corridor-floor calls.

If the gate and door of one car are closed first, then a top terminal call will be registered automatically for that car and it will make a trip to, and park at, the top floor terminal. If an up call is registered on a corridor floor push button before the car has started, or after the car has started but before it has passed the slow down zone for the floor at which the registered call exists, the car will stop at that floor on its trip to the top floor.

If the gate and door of the other car are closed after the gate and door of the first car have been closed, or after the first car has started towards the top floor terminal, the said other car will not start unless one of its up car push buttons is closed to cause it to move to another floor, in which case, it will also make a trip to the top floor.

The moment a car push-button is closed in said other car, its up call relay, its top terminal relay and its top-floor relay are energized. In response to the energization of the top-terminal relay, the transfer conductor of the car first to start is deenergized. Therefore, after the second car starts, no up corridor calls will be transferred to the floor relays of the car first to start except those which were registered prior to the closure of the top-terminal relay of the car last to start.

Assuming now that a passenger enters car A and closes the gate and door, then a top floor call will be automatically registered for car A to move it to the top floor because an energizing circuit is established for the top-floor relay 39 of car A through a circuit including conductors 353 and 391, the contact members b of the relay B159, conductor 392, normally closed contact members h of the top terminal relay B171, the floor-selector contact members 67, etc., to conductor 99. This circuit has previously been traced fully herein and will not be repeated in detail.

If an up call is registered on any of the corridor push buttons, as, for example, a call from the corridor of the second floor, the car A will stop at the second floor to pick up passengers and will then continue on its way to the fourth floor.

If the gate and door of the car B are closed after car A has started towards the top floor, car B will not start towards the top-floor terminal because the up corridor relay transfer conductor B167 of car B is deenergized. This conductor is deenergized because the contact members f of the top terminal relay 171 of the car A are open when the top-floor relay 39 of car A is closed. Therefore, in order to start car B towards the fourth floor while car A is making an up trip, an up-direction car push button in car B must be closed.

Assuming that the car push button B44 in car B is closed to move that car to the second floor, then an energizing circuit for the up floor relay B37 of car B is completed. This circuit has been traced hereinbefore and will not be repeated here.

Upon the closure of the floor relay B37, it establishes its own holding circuit, and also connects the up-floor relay conductor B178 to the car push-button circuit conductor B92. The moment the conductor B178 is energized, a circuit is completed for the up call relay B121. Upon the closure of the relay B121, a top terminal floor call is registered because the closing of the contact members a on the relay 121 completes a circuit for the floor relay B39.

Upon the energization of the top floor relay B39, the closing of its contact members c completes a circuit for the top-terminal relay B171.

The relay B171 being closed, its normally closed contact members f are opened, whereby the circuit for the top-terminal relay 171 of car A is interrupted and it is deenergized. In response to the deenergization of the relay 171 of car A, its contact members a open to deenergize the up transfer conductor 167 for the up floor relays of car A. Therefore, any up call which may be registered on a corridor push button after car B starts will be transferred to the up floor relays of car B, and car A will be disposed to answer only the second-floor call; that is, the up call that was registered before the relay B171 of car B was closed.

Since the relay B171 is energized when the floor relay B39 of car B is energized, a first-floor-terminal call will be registered for car A when it arrives at the fourth floor, and the contact members $w$ of the relay 71 close, because an energizing circuit will then be established for the floor relay 41 of car A corresponding to the bottom floor.

Car A may now be presumed to be moving toward the fourth floor. Upon arriving at the second floor, car A is stopped because its up floor relay 37 for the second floor is energized. When the corridor call at the second floor has been answered by the car A and passengers have entered that car and closed its gate and door, it will continue on its way to the fourth floor.

If it be further assumed that an up call is registered at the third-floor corridor before the car A leaves the second flooor and after car B has started to answer the second floor up call, car A will not stop at the third floor because the third floor up corridor call is transferred to the third floor up relay B38 of car B. The third floor up relay 38 of car A cannot be energized because the transfer conductor 167 of car A for the up corridor relays is deenergized, the top terminal relay B171 of car B having been energized in response to the closure of the top floor relay B39. Therefore, car A will continue towards the fourth floor without interruption, and car B will be required, on its up trip, to stop at each floor for which an up floor call may be registered.

It is to be noted that, even though the car A will not stop at any floor above the second floor in this particular case, in response to registered up corridor calls, it may be stopped at any one or all of the upper floors by operating its car push-buttons to energize its up floor relays. For example, if a passenger in car A wishes to leave the car at the third flooor, he will press the third floor up car-push button 45 to complete a circuit for the third floor up relay 38. Upon arriving at the third floor, the car will stop to permit the passenger to leave the car and will then start again towards the fourth floor in response to the closure of the gate and door.

The circuit for the up floor relay 38 that is completed upon the closure of the up car push-button 45 extends from the conductor 92, through conductors 397, the contact members of the car push-button switch 45, conductors 398 and 315, contact members 66 of the floor selector, etc., to the conductor 99.

While car A is moving towards the top-floor terminal car B is also moving in the same direction but will be stopped at all floors for which an up call is registered subsequent to the start of car B. The first floor at which car B will stop will be the second floor because the second floor relay B37 was energized when the passenger in the car B closed the car-push button B44 for an up stop at the second floor.

Since car B must answer all up calls which are registered after it leaves the first floor, car A will reach the fourth or top-floor terminal ahead of car B.

When car A arrives at the fourth-floor terminal, the energizing circuit for its first floor relay 41 is completed the moment the contact members $w$ of the relay 71 have closed in response to the deenergization of that relay. This circuit extends from the junction point 149 (which is energized because the gate relay 36, the contact members $w$ of the relay 71 and the contact members $a$ of the relay 147 are closed), through contact members $f$ of relay B102, conductors 333, 155 and 403, contact members $b$ of relay B171, conductors 404, 95 and 96, contact members 68 of the floor selector, conductor 97, the actuating coil of the first-floor relay 41 and conductor 98, to the circuit conductor 99. The car A will then proceed immediately to the first-floor terminal but will answer any down calls that may be registered either from the corridors of the several floors or by means of the down-direction car push buttons.

When car A arrives at the first floor terminal, it will park; and, when car B arrives at the fourth floor terminal, it will park also. The cars are now disposed to operate under normal conditions, that is, car A will answer all up calls and car B will answer all down calls, provided the gate and door of the respective cars are closed.

From the above description it will be observed that, when cars A and B are both moving towards the top terminal, car B having started after car A, the control circuits of both cars will be so modified or regulated that car A will, under usual conditions, arrive at the upper terminal ahead of car B and will be automatically dispatched to the first floor by the time car B arrives at the upper terminal. In other words, the control system is so disposed that the cars will tend to be synchronized towards opposite terminals at all times.

*Cars A and B parked at top floor landing—motor-generator unit or car A operating—motor-generator unit or car B not operating or disconnected*

If both of the cars A and B are parked at the top floor terminal and only the motor-generator unit of car A is operating, a first-floor terminal call will be registered automatically for car B in response to the starting of its motor-generator unit. Thereupon, car B will go to, and park at, the bottom terminal.

The starting of the motor-generator set of car B energizes the circuit-connecting relay B84, as previously described.

The closing of the contact members $e$ on the energized relay B84 completes a circuit for energizing the first-floor relay B41 to cause car B to move to the lower terminal, which circuit extends from conductor B92, (energized by the closing of the contact members $b$ of the relay B84), through conductor B413, the contact members $e$ of the relay B84, conductor B414, normally closed contact members $g$ of the relay B380, conductors B95 and B96, contact members B68 of the floor selector, conductor B97, the actuating coil of the relay B41 and conductor B98, to the control-circuit conductor B99.

Upon the energization of the relay B41, it establishes its own holding circuit through the closing of its contact members $b$, as previously described. The car will, therefore, proceed to the first-floor terminal in response to the energization of the relay B41.

The closing of the contact members $b$ on the relay B84 also completes a circuit for energizing the dual-operating relay B304, which circuit extends from conductor 87, through conductor 156, contact members $b$ of the relay B84, conductors B138, B90, B92 and B411, the actuating coil of the relay B304, and conductor B412, to the control-circuit conductor B99.

The closing of the contact members $a$ on the energized relay B304 completes a circuit for energizing a relay B380 which circuit extends from the car-push-button-circuit conductor B92, through conductors B411 and B416, the actuating coil of the relay B380, conductor B417, contact members $a'$ of the relay B304 and conductor B418, to the control circuit conductor B99.

The energization of the relay B380 causes its normally-closed contact members $g$ to open slowly and interrupt the circuit established by the contact members 4 of the relay B84 for the floor relay B41. However, inasmuch as the floor relay B41 established a holding circuit for itself when it was energized, that relay will remain energized until the car B makes its trip to the lower terminal. A dash pot may be disposed on the armature of the relay B380 to cause its contact members $g$ to open slowly so that they will not open before the relay B41 completes its own holding circuit. While both cars remain in service, the relay B380 will remain energized to prevent the closing of the circuit through the contact members $e$ of relay 84 to energize the relay B41.

*Cars A and B parked at top-floor landing—motor generator unit of car B operating—motor generator unit of car A disconnected*

If cars A and B are both parked at the top-floor terminals and only the motor-generator unit of car B is operating, a first-floor terminal call will be registered automatically for car A to move it to the lower terminal in response to the starting of its motor-generator unit. When the motor generator unit of car A is started, the circuit-connecting relay 84 is energized, as previously described, and, upon the closure thereof, a circuit for the first-floor relay 41 of car A is automatically established. This circuit extends from the control-circuit conductor 87, through conductor 89, contact members $a$ of the relay 84, conductor 90, car-push-button-control circuit conductor 92, conductor 413, contact members $d$ of the relay 84, conductor 414, normally closed contact members $g$ of the relay 380, conductors 95 and 96, contact members 68 of the floor selector, conductor 97, the actuating coil of the relay 41 and conductor 98, to the control circuit conductor 99.

Car A will, therefore, start towards the first-floor terminal because its floor relay 41 is maintained energized through contact members $b$ of the said relay, which are closed to establish a holding circuit for the coil of the relay.

When the contact members $a$ of the relay 84 are closed, a circuit for the dual operating relay 304 is completed that extends from the car-button-control-circuit conductor 92, through conductor 411, the actuating coil of the relay 304 and the conductor 412, to the control-circuit conductor 99.

Upon the closure of the relay 304, a circuit is established for the actuating coil for the relay 380 that extends from the car-button-control-circuit conductor 92 through conductors 411 and 416, contact members $a$ of the relay 304, the actuating coil of the relay 380 and conductor 418, to the control-circuit conductor 99.

When the relay 380 is closed, its normally closed contact members $g$ are opened and the circuit, which initiated the energization of the relay 41, in response to the starting of the motor-generator set of car A, is interrupted, to prevent any further energization of the relay 41 through the contact members $d$ of relay 84 while both cars remain in service.

*Cars A and B parked at first floor terminal— motor generator unit of car A operating— motor generator unit of car B disconnected.*

If cars A and B are both parked at the first-floor terminal landing and the motor-generator unit of car A is operating, a top-floor terminal call will be registered automatically for car A in response to the starting of the motor-generator unit of car B because the relay B84 will be thereby energized and closed, whereby a circuit is established for the top-floor relay 39 that extends from the control-circuit conductor 87, through conductor 89, contact members $a$ of the relay 84, conductors 90, 92 and 420, contact members $k$ of the relay B84, conductor 421, normally closed contact members $f$ of the relay B380, conductors 367 and 174, contact members 67 of the floor selector, conductor 175, the actuating coil of the relay 39 and conductor 176, to the control circuit conductor 99.

Since the relay B380 is energized in response to the closure of the relay B84; the normally-closed contact members $f$ of the relay B380 will open slowly and interrupt the circuit that established the energizing circuit for the relay 39. But, since the relay 39 establishes its own holding circuit when it is energized, it will remain closed until car A arrives at the top-floor terminal. The opening of the contact members $f$ of the relay B380 will prevent further energization of the relay 39 through the contact members $k$ of the relay B84 while both cars remain in service.

*Cars A and B parked at first-floor terminal— motor generator unit of car B operating— motor generator unit of car A disconnected*

If cars A and B are both parked at the first-floor landing and the motor-generator unit of car B is operating, a top-floor call will be registered automatically for car B in response to the starting of the motor-generator unit of car A, because a circuit for the top-floor terminal relay B39 is established. As previously mentioned herein, when the motor-generator unit of car A is operating, the relay 84 is energized and closed; therefore, when the relay 84 is closed, the top floor relay B39 for car B is energized, through a circuit that extends from the conductor B138, through conductors B90, B92 and B420, contact members $k$ of the relay 84, conductor B421, normally closed contact members $f$ of the relay 380 of car A, conductors B367 and B174, contact members B67 of the floor selector, conductor B175, the actuating coil of the relay B39 and conductor B176, to the control circuit conductor B99.

Upon the closure of the top floor relay B39, it establishes its own holding circuit and remains energized until the car B arrives at the top-floor terminal. When the relay 84 is closed, the relay 380 is energized as previously described, whereupon its contact members $f$ open slowly and interrupt the circuit of the relay B39 which was established initially in response to the starting of the car A, thereby preventing any further energization of the relay B39 through the contact members $k$ of the relay 84 while both cars remain in service.

*Cars A and B parked at an intermediate floor—Motor generator set of car A operating—Motor generator set of car B disconnected*

If cars A and B are parked at an intermediate floor, as, for example, at the second floor, and the motor generator unit of car A is operating, a top-floor terminal call for car A and a first-floor terminal call for car B will be established automatically in response to the starting of the motor-generator unit of car B.

When the motor-generator unit of car B is started, circuits are established for the top-floor relay 39 of car A and the first-floor relay B41 of car B, because the relay B84 is energized in the manner previously described.

The energizing circuit for the top-floor relay 39 of car A extends from conductor 92, through conductor 420, contact members $k$ of the relay B84, conductor 421, normally closed contact members $f$ of the relay B380, conductors 367 and 174, contact members 67 of the floor selector 64, conductor 175, the actuating coil of the relay 39 and conductor 176, to the control circuit conductor 99. The relay 39, in closing, establishes its own holding circuit and remains energized until the car A arrives at the top-floor terminal.

The energizing circuit for the bottom-floor relay B41 of car B extends from the conductor 156, through contact members $b$ of the relay B84, conductors B138, B90, B92 and B413, contact members $e$ of the relay B84, conductor B414, normally closed contact members $g$ of the relay B380, conductors B95 and B96, contact members B68 of the floor selector, conductor B97, the actuating coil of the relay B41 and conductor B98, to the control circuit conductor B99.

The floor relay B41, in closing, establishes its own holding circuit and remains energized until car B arrives at the first floor terminal.

As previously described, the relay B380 will open its contact members $g$ and $f$ to prevent subsequent energization of the floor relays through the contact members $k$ and $e$ of the relay B84 while both cars remain in service.

*Cars A and B parked at an intermediate floor—Motor generator unit of car B operating—Motor generator unit of car A disconnected*

If cars A and B are both parked at an intermediate floor, as, for example, the second floor, and the motor-generator unit of car B is operating, a top-floor terminal call for car B and a first-floor terminal call for car A are automatically established, in response to the starting of the motor-generator unit of car A.

When the motor-generator unit of car A is started, circuits are established for the first floor relay 41 of car A, and the top-floor relay B39 of car B, because the relay 84 is energized when the motor-generator unit of car A is operating, and the relay B84 is closed when the motor-generator unit of car B is started.

The circuit for the floor relay 41 of car A extends from the car-button-control-circuit conductor 92 (which is energized when the relay 84 is closed), through conductor 413, contact members $d$ of the relay 84, conductor 414, normally closed contact members $g$ of the relay 380, conductors 95 and 96, contact members 68 of the floor selector, conductor 97, the actuating coil of the relay 41 and conductor 98, to the control circuit conductor 99.

The energizing circuit for the floor relay B39 of car B extends from the control-circuit conductor 156, through contact members $b$ of the relay B84, conductors B138, B90, B92 and B420, contact members $k$ of the relay 84 of car A, conductor B421, normally closed contact members $f$ of the relay 380 of car A, conductors B367 and B174, contact members B67 of the floor selector, conductor B175, the actuating coil of the relay 39 and conductor B176, to the control circuit conductor B99. Since the floor relays 41 and B39 of cars A and B, respectively, are closed, car A will proceed to the first-floor terminal and car B to the top-floor terminal and park.

*Car A operating on single-car collector control*

When the car A is operating as a single-car collector, the motor-generator unit of the car B is deenergized. Under these conditions, the car A will answer all calls which may be registered either at the floor landings or on the push buttons in the car. When the car starts to answer a call in one direction, it will continue in that direction so long as any registered calls exist in that direction. After all the calls in one direction are answered, the car will reverse itself and answer all the calls registered in the other direction in accordance with the order of the floors.

The direction preference is maintained by the relay 71 when the car is moving in the up direction, and by the relay 72 when the car is moving in the down direction.

If the car A is parked at the first-floor terminal and up calls are registered at the corridors of the third floor and the second floor before the car leaves the first floor, or, if the car has started, before it passes the slow-down zone of the second floor, then the car will answer the second floor up call, next proceed to answer the third floor call, and then park at the third floor.

Assuming that the car is standing at the lower terminal and that a waiting passenger at the third floor corridor operates the up corridor push button 55, then the third-floor corridor relay 52 is energized to call the car to the third floor in exactly the same manner as when the cars A and B are operating as a two-car collector-control system. Upon the closure of the corridor relay 52, a circuit is established for the third-floor up relay 38 that extends from control-circuit conductor 87, through contact members $a$ of the relay 84, conductors 138 and 423, normally closed contact members $n$ of the relay B84, conductor 312, the up corridor relay transfer conductor 167, conductor 313, contact members $b$ of the relay 52, conductors 314 and 315, contact members 66 of the floor selector, conductor 316, the actuating coil of the relay 38 and conductor 317, to the control circuit conductor 99.

The floor relay 38, when closed, establishes its own holding circuit and also operates to connect the up floor relay conductor 178 to the energized car-button-control-circuit conductor 92, through a circuit extending from conductor 315 to conductor 178 and comprising conductors 321, contact members $a$ of the relay 38 and conductor 322.

When the up floor relay conductor 178 is energized, a circuit is established for the up control relay 33 and the up call relay 121. The circuits for these relays having been previously traced herein, will not be repeated.

The closing of the contact members $a$ on the up call relay 121 will not energize the top-floor relay 39 to cause the car to make a trip to the upper terminal, because the circuit for the relay 39 must pass through the contact members $a$ of the dual-operating relay B304, which relay is deenergized at present by reason of the fact that car B is not in operation. Therefore, car A will stop its up trip at the uppermost call and park there until another call is registered.

When the up control relay 33 is closed, circuits are established in turn, for the up-direction relay 31, the up-direction switch 11, the brake relay 133, high-speed relay HS and the brake-release coil 29. The circuits for the up-direction relay 31, the up-direction switch 11, and the relay 133 will not be established, however, unless the gate and door are closed to effect energization of the gate relay 36. If the gate and door are closed, the car will start upwardly at high speed to answer the corridor call at the third floor.

If the second-floor corridor push button 54 is closed before the car passes the slow-down zone for the second floor, the car will stop at the second floor, in response to the energization of the corridor relay 51, which when closed, establishes an energizing circuit for the up second floor relay 37.

The energizing circuit for the up floor relay 37 extends from the transfer conductor 167 (which is always energized when car A is operating as a single-car collector), through conductor 395, contact members $b$ of the corridor relay 51, conductors 396 and 272, contact members 65 of the floor selector, conductor 273, the actuating coil of the relay 37 and conductor 274, to the circuit conductor 99.

When the car enters the slow-down zone for the second floor, the contact members 73 of the floor selector are momentarily closed by the brush 35c to thereby establish a momentary energizing circuit for the up-direction preference relay 71. Upon the closure of the relay 71, it establishes its own holding circuit and causes the control relay 33 to be deenergized because the contact members $x$ of the relay 71 are open. A circuit for the inductor landing relay 79 is also completed, because the contact members $e$ of the relay 71 are closed.

When the up control relay 33 drops out, the circuit of the high-speed relay HS is deenergized because the contact members $a$ of the relay 33 are open. The car will now operate at low running speed until it arrives on a level with the second floor. When the car arrives on a level with the second floor, the inductor plate 264 causes the contact members of the relay 79 to open and thereby interrupt the energizing circuit for the up-direction relay 31. When the relay 31 is deenergized, the circuit for the up-direction switch 11 and the brake relay 133 is interrupted, whereupon, the motor is disconnected from the generator AG and the brake-release coil 29 is deenergized. The brake is, therefore, applied, and the car stops level with the second floor.

When the up-direction switch 31 drops out, as the car stops at the second floor, the up-direction preference relay 71 is deenergized. Assuming that the gate and the door of the car are opened before the time-element contact members $z$ of the relay 71 have opened, then the circuit for the relay 71 is reestablished, which circuit extends from the car-button-control-circuit conductor 92, through conductor 246, normally closed contact members $g$ of the gate relay 36, conductor 247, normally closed contact members $f'$ of the relay 159, conductors 248 and 291, contact members $z$ of the relay 71, conductors 292 and 284, the actuating coil of the relay 71, conductors 285 and 183, normally closed contact members $g$ of the relay 34, and conductor 184, normally closed contact members $f$ of the relay 32 and conductor 185, to the control circuit conductor 99.

Since the up direction preference relay 71 is re-energized when the gate and door are opened, its normally closed contact members $x$ and $y$ will remain open until the gate and the door are closed. When the gate and the door are closed, the circuit of the preference relay 71 will be interrupted, its contact members $z$ will open, and its contact members $x$ and $y$ will close at the end of a predetermined length of time, for example, five seconds. However, inasmuch as the contact members $x$ of the relay 71 will close before its contact members $y$, the control relay 33 will be reenergized, provided an up call is still registered but unanswered.

Assuming that the passenger who registered the second-floor call enters the car and closes the gate and the door, then the car will proceed towards the third floor because the up control relay 33 is reenergized when the contact members $x$ of the up preference relay 71 are closed.

When the car enters the slow-down zone for the third floor, the contact members 74 of the floor selector 64 are momentarily closed by the brush 35a and thereby establish an energizing circuit for the up-direction preference relay 71, as previously described. The car will now run at slow speed until it arrives on a level with the third floor. When the car arrives on a level with the third floor, the inductor plate 245 causes the contact members of the landing relay 79 to open and effect, in turn, the deenergization of the up-direction relay 31, the up-direction switch 11, and the brake relay 133, thereby stopping the car level with the third floor. Since there are no other up-direction calls registered, the car will remain at the third floor until either one or more up-direction calls or one or more down-direction calls are registered.

Assuming that the passenger who registered the up call at the third floor corridor desires to go to the fourth floor, he opens the gate and the door, enters the car, closes the gate and the door and then presses the up car push button 46. The pressing of the push button 46 completes a circuit for the top-floor relay 34, and the car proceeds to the fourth floor or top-terminal landing. The control system is now in such condition that the car will answer any floor call, irrespective of its direction; that is, the car will move in the down direction in response to the registering of either up or down calls.

In the operation of the car A as a single-car collector, it may often happen, when the car is moving in the up-direction in response to the registering of up-floor calls, that down calls will be registered before all of the up calls have been answered. In this case, the down calls will be transferred to the down floor relays, but the up-direction preference relay 71 will cause the up control relay 33 to be reenergized whenever the relay 71 is deenergized and, at the same time, will prevent the energization of the down control relay 34, by reason of the fact that the contact members $x$ close before the contact members $y$ close. Therefore, the car will operate in the up dirtction so long as any up calls are registered.

When the last up call has been answered, the car will answer the down calls in the order of the floors and not in the order in which the calls are registered, provided no further up calls are registered before the contact members *x* of the relay 71 are closed.

After the last up-floor call has been answered, if another up call is registered prior to the closure of the contact members *x* of the relay 71, the car will answer the farthest up call before answering the down calls.

Assuming now a condition where a down-floor call is registered at the second-floor corridor before the car arrives at the third floor while moving in the up direction, and that a passenger opens the gate and the door of the car at the third floor, enters, and presses the top-floor push button 46, then the car will proceed to the fourth floor before answering the second-floor down call.

When the down second-floor relay 42 is energized and closed by the operation of the down corridor push button 62, the down-direction floor relay circuit conductor 108 is energized. Also, when the top-floor relay 39 is energized by the operation of the up car push button 46, the up-direction floor relay circuit conductor 178 is energized. Inasmuch as both of these floor relays are closed in the case under consideration, both of the floor-relay-circuit conductors 108 and 178 are energized; but, since the up-direction preference relay is energized when the gate and door are open and the car is at the third floor, up control relay 33 will be reenergized and not the down control relay 34, when the relay 71 is deenergized in response to the closure of the gate and the door. This operation is effected because, when the preference relay 71 is deenergized, its contact members *x* close before its contact members *y* close; therefore, upon the closure of the contact members *x*, the control relay 33 is energized to cause the car to move to the fourth floor and the opening of its normally closed contact members *g* prevent the energization of the down control relay 34.

When the car arrives at the fourth floor, the relay 39 is deenergized and, since this is the last up direction floor call to be answered, the up-direction floor relay conductor 178 is deenergized when the contact members *b* and *a* of the relay 39 are opened.

Inasmuch as the down-direction floor-relay-circuit conductor 108 is energized, because the down floor relay 42 is closed, the down-direction control relay 34 is now energized when the contact members *y* of the up-direction preference relay 71 are closed. The circuit for the relay 34 extends from the conductor 108, which is energized, through conductor 109, normally closed contact members *g* of the relay 31, etc., to the control circuit conductor 99.

The car will now move to the second floor, and, upon its arrival at the second floor, it will stop to pick up any passenger who may be waiting at that floor.

If the car is parked at the top-floor terminal and down calls are registered, the down-direction floor-relay-circuit conductor 108 is energized and will remain so energized as long as any down calls remain unanswered. If any up calls are registered while there are down calls registered but unanswered, the up direction floor-relay-circuit conductor 178 will also be energized. But, since the contact members *x* of the down direction preference relay 72 close before its contact members *y* close, the down-direction control relay 34, instead of the relay 33, will always be energized whenever the relay 72 is deenergized by the closure of the gate and the door of the car, with both conductors 108 and 178 in an energized condition. Therefore, the car will answer all the down calls before answering the up calls.

The calls will be answered in the order of the floors and not in the order in which the calls may be registered from the corridors of the several floors. When the car has answered its last call in the down direction, and the gate and the door are closed, the up-direction control relay 33 will be energized in response to the closure of the contact members *y* of the relay 72, provided there are up calls in existence.

If a farther down call is registered before the contact members *y* of the down preference relay 72 close, the down-direction control relay 34 will be reenergized. Thereupon, the car will start and continue on its way in the down direction in response to the unanswered down calls before it will reverse its direction of movement and answer the up calls.

*Calling car A down by closing up-direction corridor push-button switches*

When one of the cars A or B is operating as a single-car collector-control system, a passenger standing at a corridor of a floor may not be able to see whether the car is parked above or below that floor. Therefore, it is desirable to have the control system so constructed and installed that the car may be called to the particular floor in response to the closure of either of the up or the down-direction corridor push buttons.

For instance, the system should be so constructed and installed that, if the car A is parked at the top-floor terminal and either the up corridor push button 54 or the down corridor push button 62 at the second floor is operated, the car will proceed to, and stop at, the second floor.

If the down corridor push button 62 is operated, the car will be called to the second floor, as previously described.

However, assuming that a passenger presses the up corridor push button 54 instead of the down button 62 while the car is at the upper terminal, then an energizing circuit is established for the up corridor-relay 51 that will cause the car to move down to the second floor, which circuit extends from the conductor 294, through conductors 295 and 425, the push button 54, conductor 426, the coil of the relay 51, conductor 427, normally closed contact members *f* of the relay 37, conductor 428, normally closed contact members *f* of the relay B37 and conductors 429, 301 and 302, to the conductor B99.

The closing of the contact members *b* and *a* on the up corridor relay 51 completes a self-holding circuit for that relay which extends from the control circuit conductor 138, through conductor 423, normally closed contact members *n* of the relay B34, conductors 312 and 395, contact members *b* of the relay 51, conductors 396 and 272, contact members 290 of the floor selector, conductors 430 and 108, normally closed contact members *f'* of the relay 32, conductor 431, normally closed contact members *n* of the relay B304, conductors 432, 307 and 433, contact members *a* of the relay 51, conductors 434 and 426, the actuating coil of the relay 51, conductor 427, normally closed contact members *f* of the up floor relay 37 of car A, conductor 428, normally closed contact members *f* of the up floor relay B37 of car B and conductors 429, 301 and 302, to the conductor B99.

Upon closure of the contact members *b* of the relay 51, the down-direction floor relay circuit conductor 108 is energized through a circuit included in the holding circuit of the said relay 51, as previously described.

Upon energization of the down floor relay conductor 108, a circuit is completed for the down-direction control relay 34 that extends from the conductor 108 to the conductor 99, as previously described.

When the down control relay 34 is closed, a circuit is established for the down-direction relay 32 because contact members c of the relay 33 and the contact members c of the gate relay 36 are closed. Upon the closure of the down-direction relay 32, its contact members f are opened and its contact members d are closed; thereupon the holding circuit for the corridor relay 51 is transferred to conductor 87. This circuit may be traced from conductor 87, through conductor 89, contact members a of the relay 84, conductors 90 and 435, contact members d of the relay 32, conductors 436 and 431, contact members n of the relay B304 and conductors 432 and 433, etc., to the conductor B99.

Since the holding circuit for the relay 51 is maintained upon the closure of the relay 32, the conductor 108 is maintained energized also. Therefore, the down control relay 34 will remain energized until the car enters the slow-down zone for the second floor.

When the car A enters the slow-down zone for the second floor, the contact members 290 on the floor selector are opened by the pin 35c, thereby interrupting the energizing circuit for the down control relay 34 to decelerate the car and stop it at the second floor.

The relay 34, being deenergized, opens its contact members a to interrupt the energizing circuit for the high-speed relay HS. Thereupon, the resistor 20 is reinserted in the field winding 9 of the generator AG, and the car decelerates to its slow speed.

When the down control relay 34 is deenergized, the closing of its contact members f establishes an energizing circuit for the down-direction preference relay 72 that extends from conductor 92, through conductor 134, contact members b of the inductor landing relay 79, conductors 135 and 136, contact members c of the relay 32, conductors 137, 128 and 234, contact members b of relay 32, conductor 235, normally closed contact members f of the down control relay 34, conductor 232, the actuating coil of the preference relay 72, conductors 233 and 113, normally closed contact members g of the up control relay 33, conductor 114, normally closed contact members f of the relay 31 and conductor 115, to the conductor 99.

In response to the closure of the down-direction preference relay 72 the energizing circuit of the inductor landing relay 79 is established; therefore, upon the arrival of the car on a level with the second floor, the inductor plate 264 causes the inductor landing relay to open its contact members b and thereby interrupt the energizing circuit for the down-direction relay 32. The car then stops level with the floor in order that passengers may either enter or leave the car.

*Calling car A up by closing a down direction corridor push button*

If the car A is located at the first floor terminal or at any other floor, with its gate and door closed, it may be called up to any floor by closing the down corridor push button at that floor.

Assuming, for example, that the car is located at the second floor and that a passenger at the third floor corridor, desiring to call the car to the third floor, presses the down corridor push-button 63, then the operation of the button 63 completes a circuit for energizing the down corridor relay 59 to cause the car to move up to the third floor, which circuit extends from conductor 87, through conductor 207 and the contact members of the push button 63 etc., to the control circuit conductor B99, as previously described.

The closing of the contact members b and a on the down corridor relay 59 completes a self-holding circuit for that relay extending from the energized conductor 138, through the normally closed contact members g of the relay B304, conductors 438 and 218, contact members b of the relay 59, conductors 219 and 220, contact members 252' of the floor selector, conductors 335 and 178, normally closed contact members g' of the up-direction relay 31, conductor 439, normally closed contact members n of the relay B84, conductors 440, 216 and 217, contact members a of the relay 59, conductor 208, the actuating coil of the relay 59, conductor 209, normally closed contact members f of the down floor relay 43 of car A, conductor 210, normally closed contact members f of down floor relay B43 and conductors 211 and 348, to the control-circuit conductor B99.

Upon the closure of the contact members b of the down corridor relay 59, the up-direction floor relay conductor 178 is energized through a circuit included in the holding circuit of the relay 59, as previously described.

The energization of the up floor relay conductor 178 completes a circuit for the up control relay 33, as previously described.

The closing of the contact members c on the up-direction relay 33 completes an energizing circuit for the up-direction relay 31, as previously described.

Upon the closure of the relay 31, the holding circuit for the down corridor relay 59 is transferred to the car-button-control-circuit conductor 92, because the contact members g' of the relay 31 are opened and its contact members d are closed. The holding circuit, as transferred, extends from conductor 92, through conductor 441, contact members d of the relay 31, conductors 442 and 439, normally closed contact members n of the relay B84 and conductors 440, 216 and 217 etc., to the control-circuit conductor B99.

In response to the closure of the relay 31, the car starts upwardly. When it enters the slow-down zone for the third floor, the contact members 252' on the floor selector are opened by the pin 35b, whereupon the energizing circuit for the up high-speed relay 33 is interrupted. The closing of the contact members f on the deenergized control relay 33 establishes an energizing circuit for the up preference relay 71 that extends from the car-button conductor 92, through conductor 134, normally closed contact members b of the inductor relay 79, conductor 135, contact members c of the relay 31, conductors 200 and 195, contact members b of the relay 31, conductor 286, normally closed contact members f of the up high-speed relay 33, conductor 284, the actuating coil of the relay 71, conductors 285 and 183, normally closed contact members g of the down control relay 34, conductor 184, normally closed contact members f of the down-direction relay 32 and conductor 185, to the control circuit conductor 99.

Upon the closure of the relay 71, an energizing circuit is established for the inductor relay 79; therefore, when the car arrives on a level with the third floor, the inductor landing plate 245 operates to open the contact members b of the inductor relay 79, whereby the car is stopped level with the third floor, as previously described.

Since car B, when operating as a single-car collector, functions in substantially the same manner as car A, the operation of car B as a single-car collector will not be described because it may be ascertained readily from the description of the operation of the car A as a single-car collector.

As various modifications may be made in the invention herein disclosed without departing from the spirit and scope thereof, it is desired that only such limitations shall be placed on the invention as are imposed by the prior art and the appended claims.

I claim as my invention:

1. In a control system for a pair of elevator cars operable past a plurality of floors, up-direction and down-direction floor relays for each floor for each car, for moving that car to, and stopping it at, a floor, up-direction and down-direction corridor relays associated with each floor for energizing said floor relays, passenger-operated means disposed at each floor for registering calls to energize said corridor relays, and means responsive to the relative position of the cars for permitting the energization of the floor relays of one car for only one direction when one of the floor relays of the other car is energized for the other direction.

2. In a control system for a pair of elevator cars operable past a plurality of floors, up-direction and down-direction floor relays for each floor for each car, for moving that car to, and stopping it at, a floor, up-direction and down-direction corridor relays associated with each floor for energizing said floor relays, passenger-operated means disposed at each floor for registering calls to energize said corridor relays, and means responsive to the relative position of the cars for permitting the energization of the floor relays of one car for only one direction when one of the floor relays of the other car is energized for the other direction and means operably responsive to the energization of a floor relay for deenergizing the corridor relay that effected the energization of that floor relay.

3. In a control system for a pair of elevator cars operable past a plurality of floors, passenger-operated call-registering means at each floor for causing said cars to move to, and stop at, said floors, call-registering means disposed in each car for moving that car to, and stopping it at, said floors, means responsive to the starting of said cars in succession from the same floor to run in the same direction at the same time for causing the car first to start to answer the floor calls registered in the direction of its travel prior to the start of the second car and for causing the car second to start to answer all the floor calls in its direction of travel registered subsequent to its start.

4. In a control system for a pair of elevator cars operable past a plurality of floors between two terminals, passenger-operated call-registering means at each floor for causing said cars to move to, and to stop at, said floors, call-registering means associated with each car for moving that car to, and stopping it at, said floors, means responsive to the starting of said cars in succession from the same floor to run in the same direction at the same time for causing the car first to start to answer the floor calls registered in the direction of its travel prior to the start of the second car and for causing the car second to start to answer all the floor calls in its direction of travel registered subsequent to its start, and means for causing the car first to start to automatically move to the terminal in its direction of travel.

5. In a control system for a pair of elevator cars operable past a plurality of floors between two terminals, passenger-operated call-registering means at each floor for causing said cars to move to, and to stop at, said floors, call-registering means disposed in each car for moving that car to, and stopping it at, said floors, means responsive to the starting of said cars in succession from the same floor to run in the same direction at the same time for causing the car first to start to answer the floor calls registered in the direction of its travel prior to the start of the second car and for causing the car second to start to answer all the floor calls in its direction of travel registered subsequent to its start, means for causing the car first to start to automatically move to the terminal in its direction of travel, and means operably responsive to the movements of the cars for causing the first car, upon arriving at said terminal, to move to the opposite terminal.

6. In a control system for a pair of elevator cars operable past a plurality of floors between two terminal floors, passenger-operated call means for moving said cars to, and stopping them at, said floors, means operably responsive to the operation of said call means for causing said cars to park at opposite terminal floors, means for disconnecting one of said cars from said system, and means operably responsive to the operation of said disconnecting means for causing the other of said cars to park at the floor at which it stops in answer to the last operation of said call means.

7. In a control system for a pair of elevator cars operable past a plurality of floors between two terminal floors, up-direction and down-direction call means disposed at said floors for moving said cars to, and stopping them at, said floors, means operably responsive to the operation of said call means for causing said cars to answer only calls in their direction of travel, means for disconnecting one of said cars from said control system, and means responsive to the operation of said disconnecting means for causing the other of said cars, when parked, to move directly to any floor upon the operation of either the up-direction or the down-direction call means disposed at that floor.

8. In a control system for a plurality of elevator cars operable past a plurality of floors, motive means for each of said cars, call-registering means disposed at each of said floors for starting said motive means, means for closing the entrance to each of said cars, means operably responsive to operation of said closing means for preventing said call-registering means from starting the motive means of a car until the entrance to that car is closed, and means for rendering the car first to have its entrance closed operable, while the entrance to the other car remains open, to answer all the calls registered at the several floors.

9. In a control system for a pair of elevator cars operable past a plurality of floors between two terminals, motive means for each of said cars, passenger-operated call means for causing said motive means to move said cars to and stop them at said floors, means for independently closing the entrance to each of said cars, means operably responsive to the operation of the closing means for a car for preventing said call means from starting said motive means for that car until the entrance of that car is closed, means operably responsive to the closing of the entrance of one of said cars, when both cars are parked with open entrances at the same terminal, for causing the car having its entrance closed to move to the opposite terminal.

10. In a control system for a pair of elevator cars operable past a plurality of floors between two terminals, motive means for each of said cars, passenger-operated call means for causing said motive means to move said cars to and stop them at said floors, means for independently closing the entrance to each of said cars, means operably responsive to the operation of the closing means for a car for preventing said call means from starting said motive means for that car until the entrance of that car is closed, means operably responsive to the closing of the entrance of one of said cars, when both cars are parked with open entrances at the same floor, for causing the car having its entrance closed to move to one of said terminals.

11. In a control system for a pair of elevator cars operable past a plurality of floors between two terminal floors, a motive means for each of said cars, a motor-generator set for each of said motive means for supplying power thereto, means for placing the motor-generator set of a car into operation, passenger-operated call means for causing said motive means to move said cars to and stop them at said floors, means operably responsive to the operation of a motor generator set for causing the car corresponding thereto to answer the registration of a call on the call means, means operably responsive to the placing of the motor-generator set of a second car into operation for causing said cars to move to, and park at, opposite terminals, and operably responsive to movement of either car away from the station where it is parked for causing the other car to move to and park at that station.

12. The combination with a pair of elevator cars operable past a plurality of floors between a pair of terminal floors, a motor-generator set for each of said cars, means for connecting the motor-generator set of each car to a source of power, and a control system for each car of means operably responsive to the connection of said motor-generator sets to a source of power for connecting said control systems in such manner as to cause said cars to park at opposite terminal stations and, upon movement of either car from the station where it is parked, to cause the other car to move to and park at that station.

13. The combination with a pair of elevator cars operable past a plurality of floors between two terminal floors, a motor-generator set for each car, independent means for connecting the motor-generator set of each car to a source of power, a control system for each car, and up-direction and down-direction call means disposed at said floors and common to both cars for moving said cars to, and stopping them at, said floors, of means operably responsive to the connection of said motor-generator sets to a source of power for connecting said control systems in such manner as to cause said cars to move to, and park at, opposite terminals and to answer only floor calls registered in their direction of travel.

14. In a control system for a plurality of elevator cars, call means common to said cars for causing the starting of both of said cars, means for controlling the starting of either of said cars in response to operation of said call means in accordance with the position of the other of said cars, call means individual to each of said cars, and means responsive to operation of one of said individual call means for causing the starting of the associated car regardless of the position of the other of said cars.

15. In a control system for a plurality of elevator cars operable between two opposite terminal positions, call means common to said cars, means responsive to an operation of said call means to cause said cars to move to and park at opposite terminal positions, means adapted to prevent the restarting of either car from a terminal position in response to said call means unless the other car is at a terminal position, call means individual to each of said cars, and means responsive to said individual call means for causing the starting of the associated car regardless of the position of the other car.

LUTHER J. KINNARD.